US010903962B2

(12) United States Patent
Hwang et al.

(10) Patent No.: US 10,903,962 B2
(45) Date of Patent: Jan. 26, 2021

(54) METHOD FOR TRANSMITTING DEMODULATION REFERENCE SIGNAL IN WIRELESS COMMUNICATION SYSTEM FOR SUPPORTING NARROWBAND IOT, AND DEVICE THEREFOR

(71) Applicant: LG ELECTRONICS INC., Seoul (KR)

(72) Inventors: Seunggye Hwang, Seoul (KR); Yunjung Yi, Seoul (KR); Kijun Kim, Seoul (KR); Bonghoe Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/991,520

(22) Filed: Aug. 12, 2020

(65) Prior Publication Data

US 2020/0389272 A1 Dec. 10, 2020

Related U.S. Application Data

(63) Continuation of application No. 16/082,886, filed as application No. PCT/KR2017/002438 on Mar. 7, 2017, now Pat. No. 10,778,396.

(Continued)

(51) Int. Cl.

*H04L 5/00* (2006.01)
*H04L 27/26* (2006.01)

(Continued)

(52) U.S. Cl.

CPC ............ *H04L 5/0051* (2013.01); *H04L 5/001* (2013.01); *H04L 5/0007* (2013.01); *H04L 25/0204* (2013.01); *H04L 27/26* (2013.01); *H04L 67/12* (2013.01); *H04L 12/4612* (2013.01); *H04L 27/20* (2013.01); *H04L 27/2636* (2013.01)

(58) Field of Classification Search

CPC ....... H04L 5/10; H04L 5/0051; H04L 5/0007; H04L 27/2613; H04L 27/2602; H04L 27/261; H04W 24/10; H04W 72/0413; H04J 13/0029

See application file for complete search history.

(56) References Cited

U.S. PATENT DOCUMENTS

2012/0294272 A1* 11/2012 Han .................. H04W 72/0406 370/329
2017/0201362 A1* 7/2017 Park ...................... H04L 5/0048

FOREIGN PATENT DOCUMENTS

KR 1020140138123 12/2014

OTHER PUBLICATIONS

Ericsson, RAN1 Agreements for Rel-13 Nb-IoT, Feb. 15-19, 2016 (Year: 2016).

(Continued)

*Primary Examiner* — Jae Y Lee
*Assistant Examiner* — Aixa A Guadalupe Cruz
(74) *Attorney, Agent, or Firm* — Dentons US LLP

(57) ABSTRACT

This specification discloses a method for transmitting a demodulation reference signal (DMRS) in a wireless communication system supporting NB (Narrow-Band)-IoT (Internet of Things), the method performed by a User Equipment (UE) including generating a reference signal sequence used for demodulation; mapping the reference signal sequence to at least one symbol; and transmitting the demodulation reference signal (DMRS) to a base station through a single subcarrier in the at least one symbol.

12 Claims, 28 Drawing Sheets

Related U.S. Application Data

(60) Provisional application No. 62/318,764, filed on Apr. 6, 2016, provisional application No. 62/320,628, filed on Apr. 11, 2016, provisional application No. 62/321,259, filed on Apr. 12, 2016, provisional application No. 62/321,749, filed on Apr. 13, 2016, provisional application No. 62/321,801, filed on Apr. 13, 2016, provisional application No. 62/304,338, filed on Mar. 7, 2016.

(51) Int. Cl.

| | |
|---|---|
| ***H04L 29/08*** | (2006.01) |
| ***H04L 25/02*** | (2006.01) |
| *H04L 27/20* | (2006.01) |
| *H04L 12/46* | (2006.01) |

(56) References Cited

OTHER PUBLICATIONS

XP051090321, R1-163943; 3GPP TSG-RAN WG1 Meeting #84bis, Busan, Korea, Apr. 11-15, 2016, WI rapporteur (Ericsson), "RAN1 agreements for Rel-13 Nb-IoT," pp. 1-28.
XP051096427, R1-1644943; 3GPP TSG RAN WG1 Meeting #85, Nanjing, China, May 23-27, 2016, LG Electronics," Discussion and comments on Nb-IoT CRs," pp. 1-2.
XP051053810, R1-160477; 3GPP TSG RAN WG1 Meeting #84, St. Julian's,Malta, Feb 15-19, 2016; ZTE; "Uplink Dm RS design for Nb-IoT," pp. 1-5.
LG Electronics, "Discussions on PUSCH Design for Nb-IoT," R1-160122, 3GPP TSG RAN WG1 Meeting Nb-IoT Ad-Hoc, Budapest, Hungary, Jan. 12, 2016, see sections 1-2.3.
3GPP TS 36.211 v13.0.0, 3GPP; TSGRAN; E-UTRA; Physical Channels and Modulation (Release 13); Jan. 6, 2016, see sections 5.2.3, 7.2, 9.3.6.
ZTE, "Uplink DM RS Design for Nb-IoT," R1-160477, 3GPP TSG RAN WG1 Meeting #84 St. Julian's, Malta, Feb. 25, 2016, see sections 2.1-2.2.2.
Nokia Networks et al, "On UL DMRS Design for Nb-IoT," R1-160455, 3GPP TSG RAN1 Meeting #84, St. Julian's, Malta, Feb. 5, 2016, see sections 2.1-2.2.

* cited by examiner

【Figure 2】
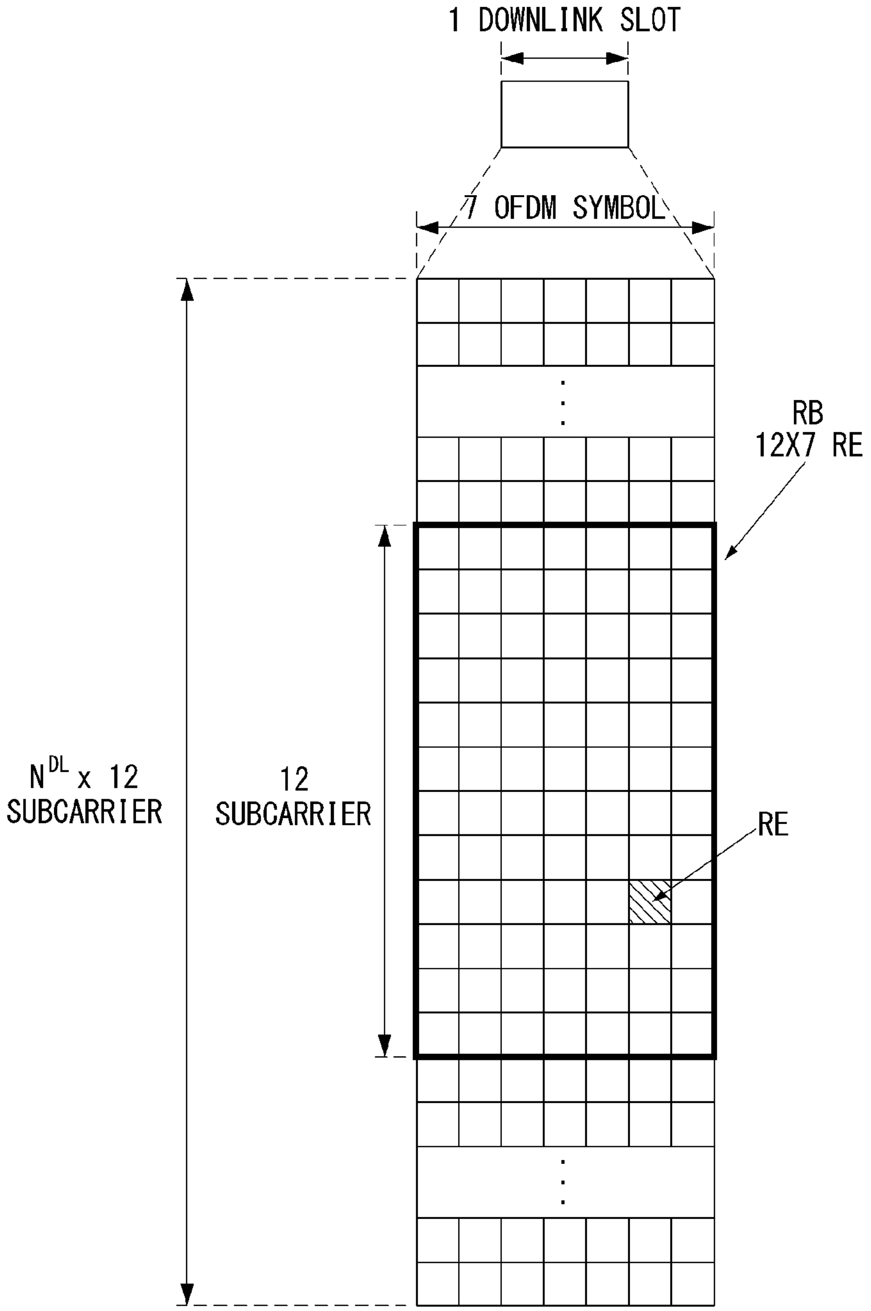

【Figure 3】
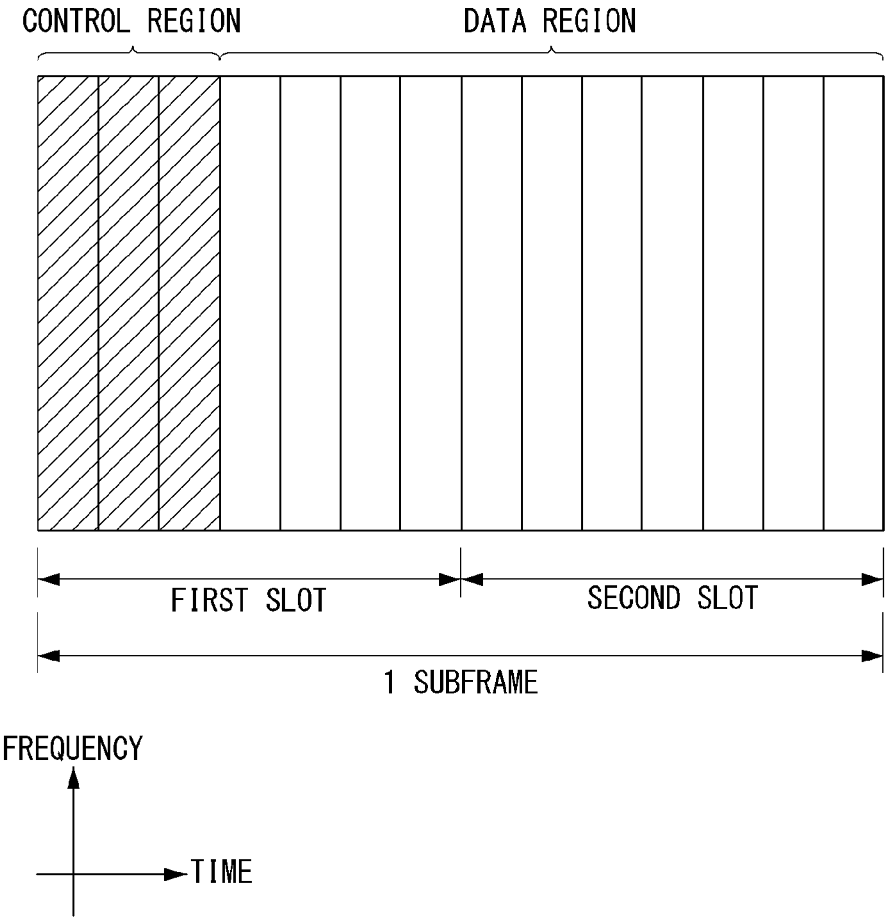

【Figure 4】
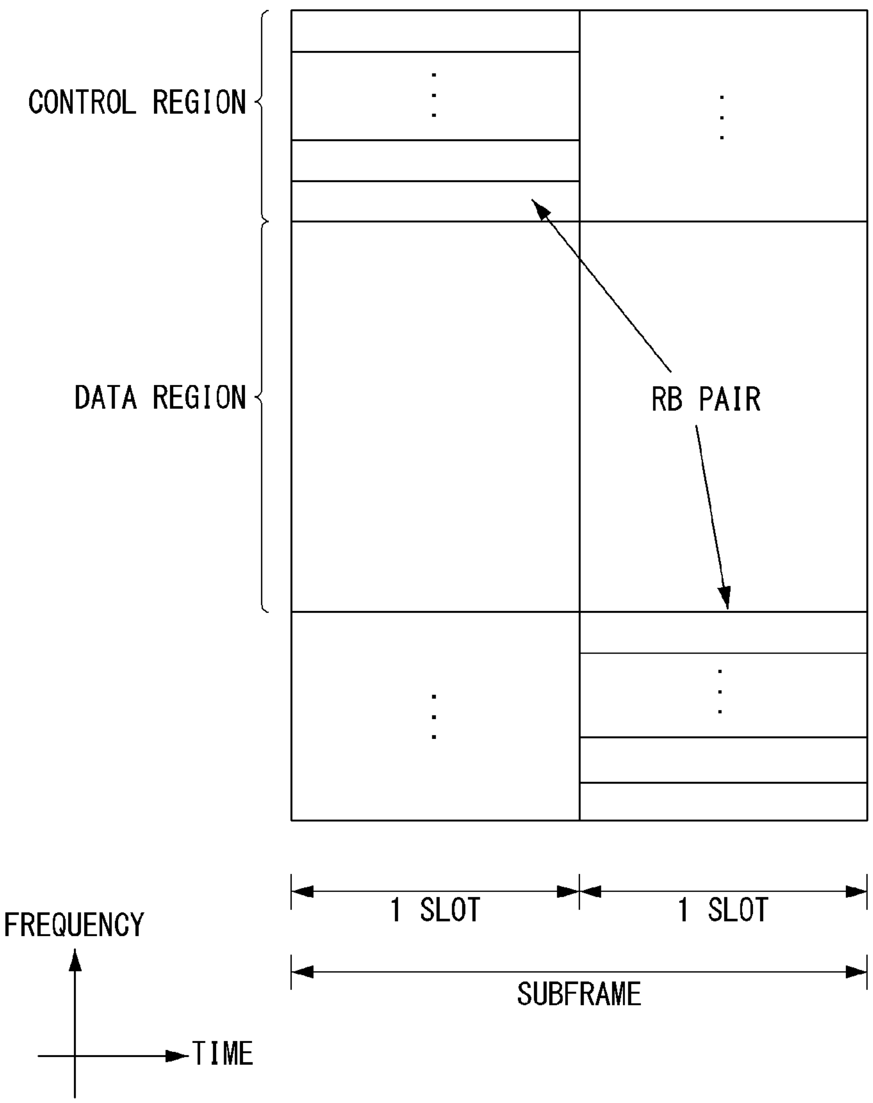

【Figure 5】
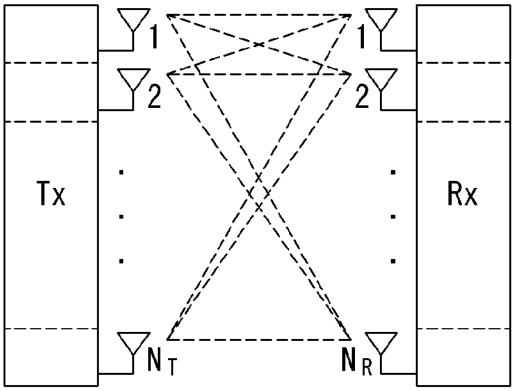
【Figure 6】
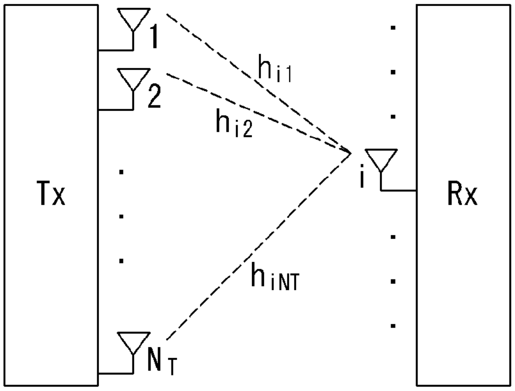

(a) In-band system (b) Guard-band system (c) Stand-alone system

【Figure 17】

【Figure 19】
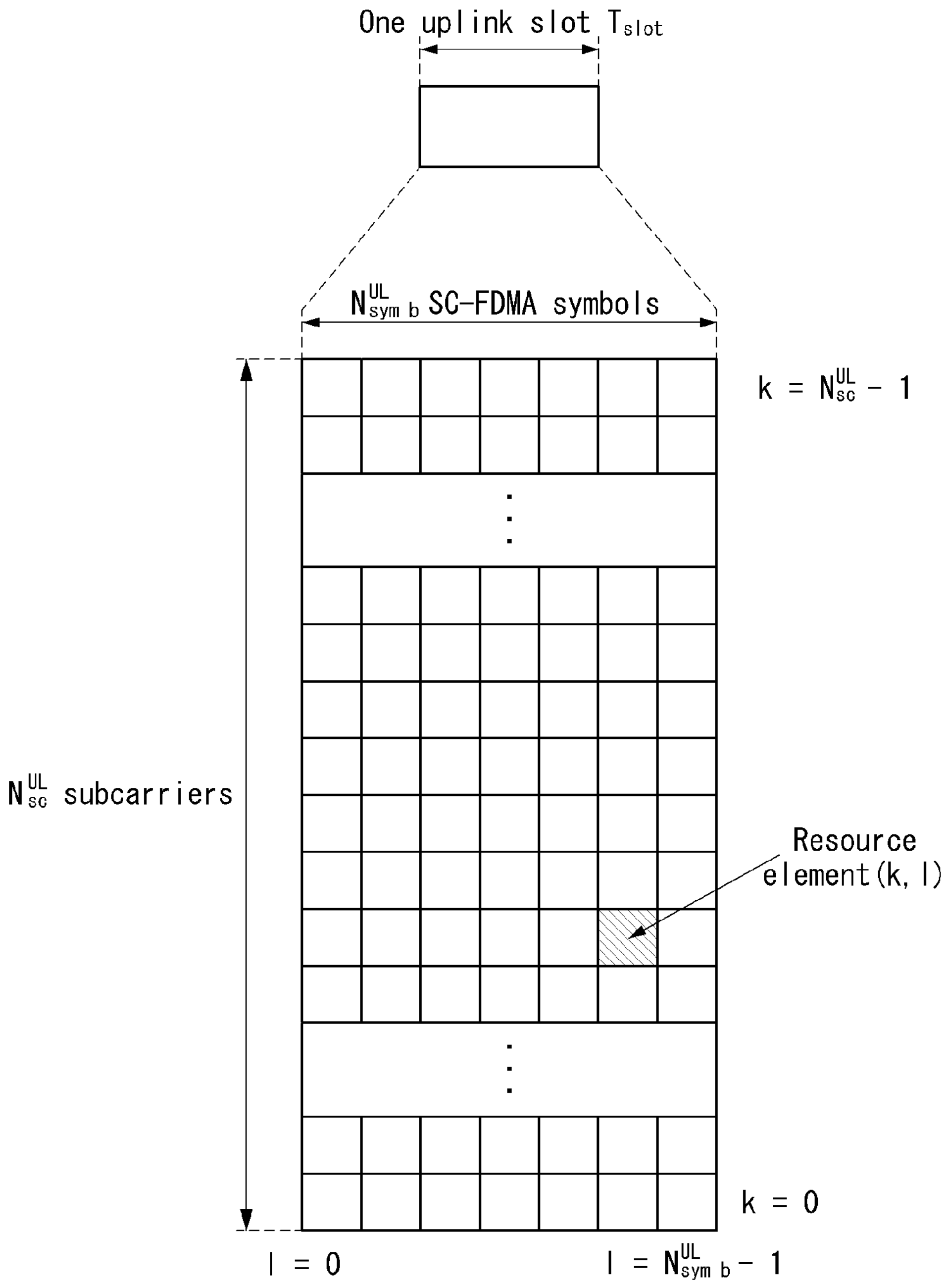

【Figure 20】
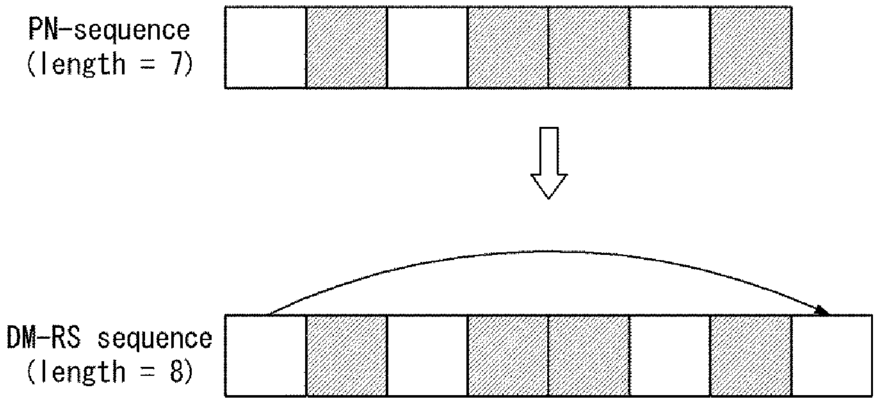
【Figure 21】
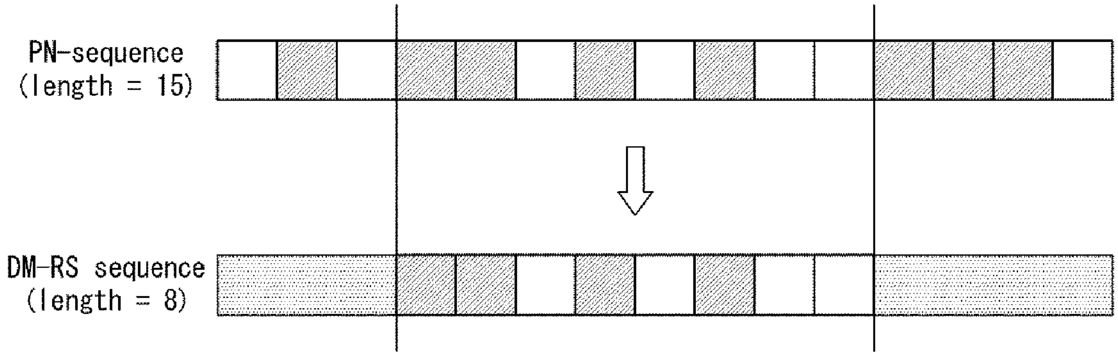

【Figure 22】
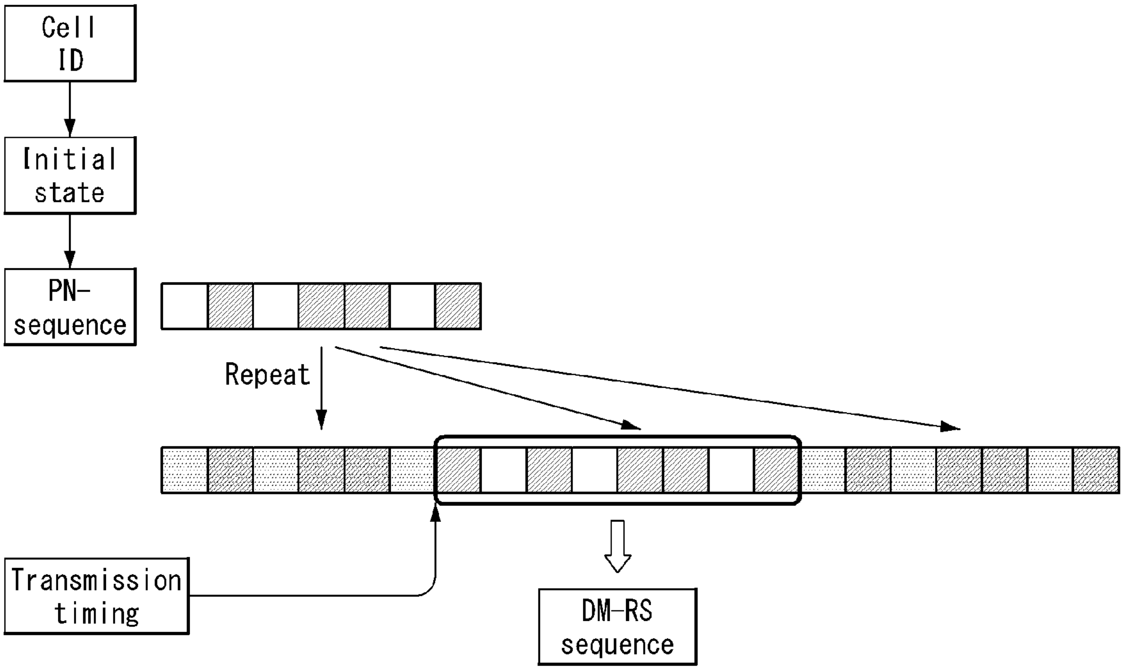

【Figure 23】
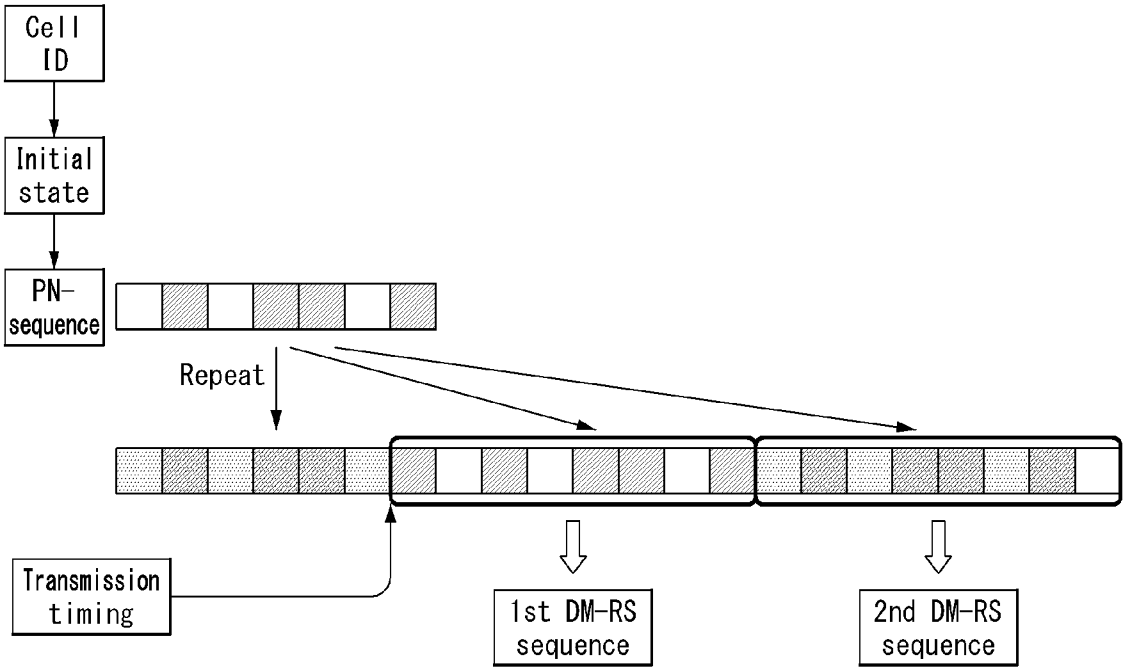

【Figure 25】
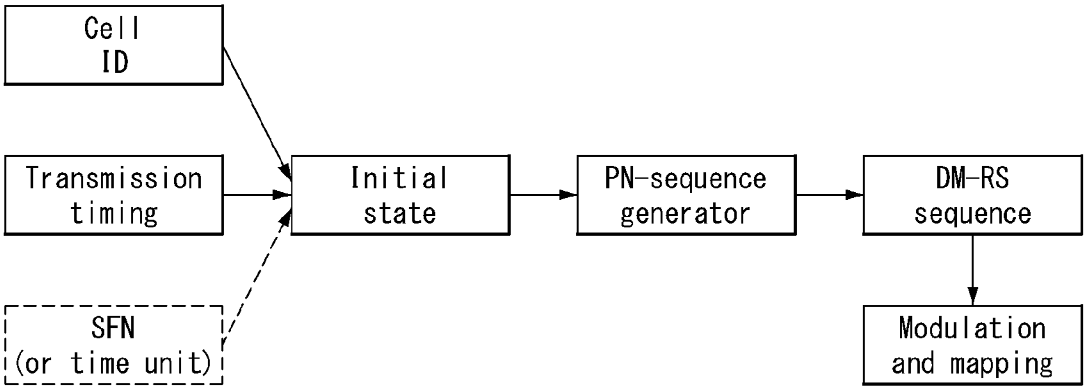
【Figure 26】
Cell ID based initial state → (index 1)
State shift with timing (and/or SFN)
| index | state |
|---|---|
| 0 | 1 0 0 0 |
| 1 | 1 1 0 0 |
| 2 | 0 1 1 0 |
| 3 | 1 0 1 1 |
| 4 | 0 1 0 1 |
| 5 | 0 0 1 0 |
| 6 | 0 0 0 1 |
⇨ (index 4) Sequence generation starts with this state 【Figure 28】
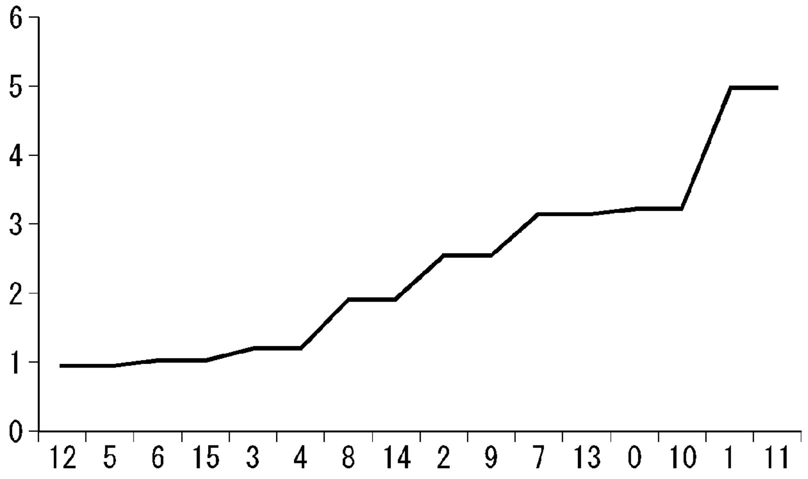
【Figure 29】
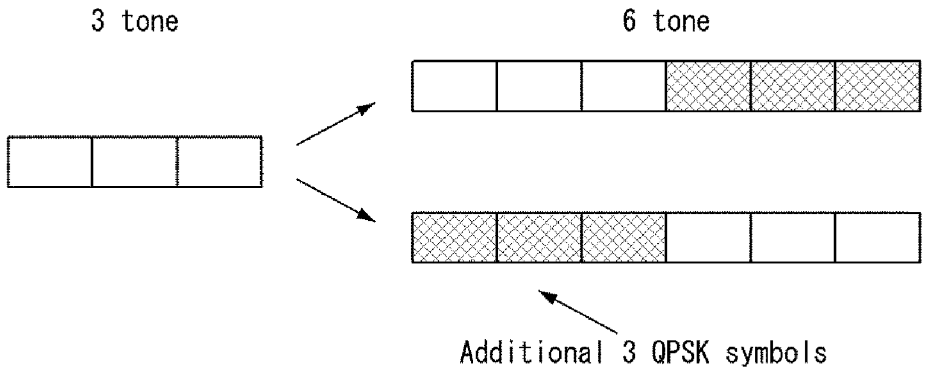

【Figure 30】
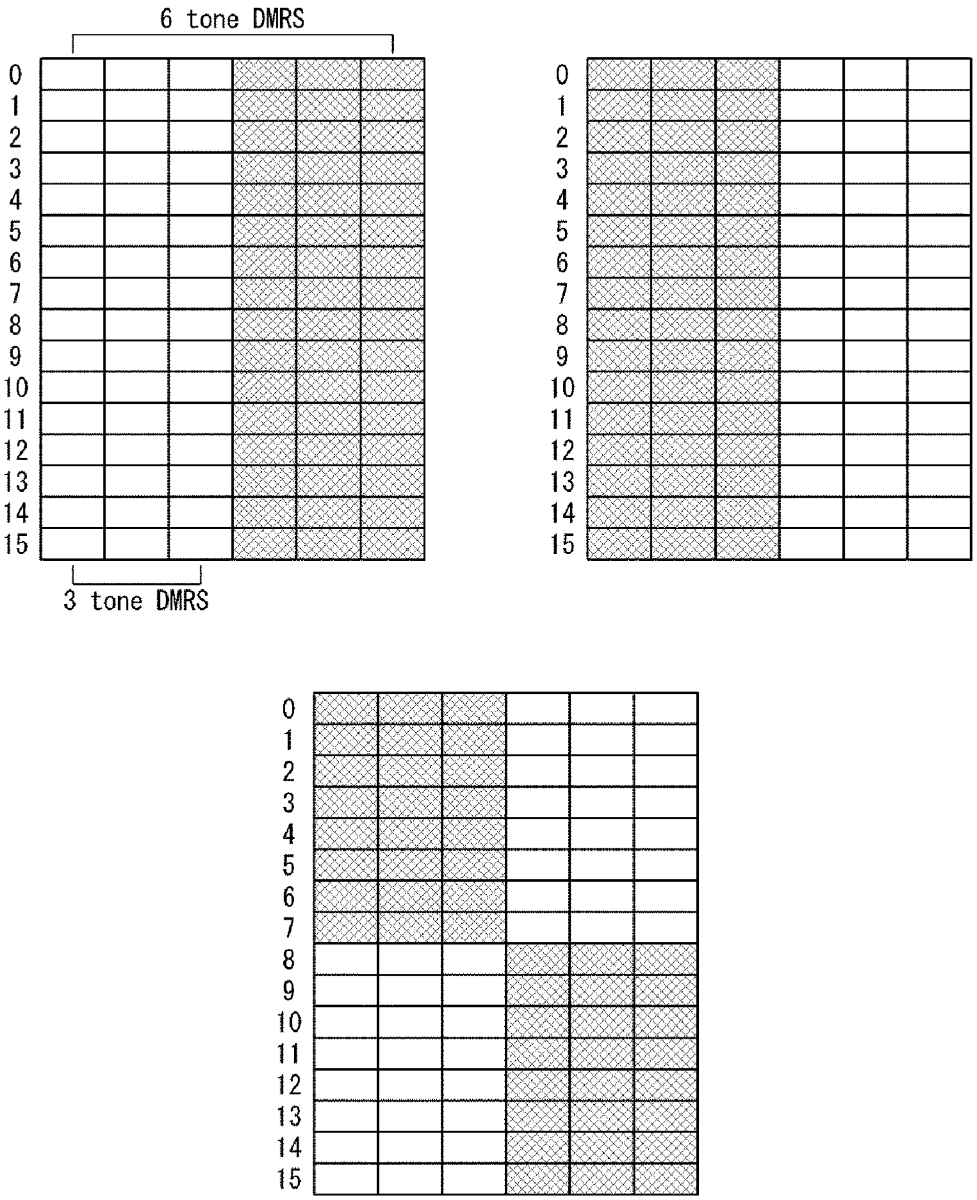

【Figure 31】
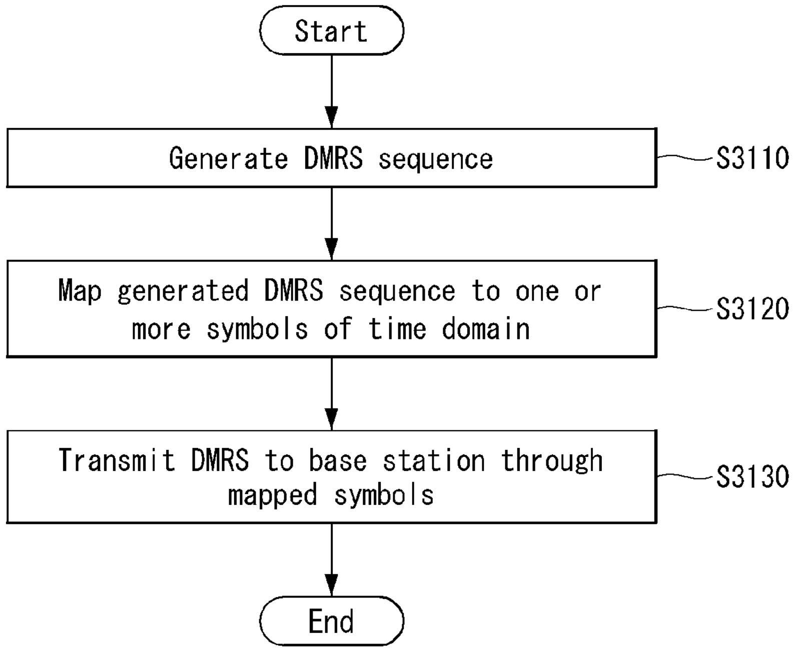

【Figure 32】
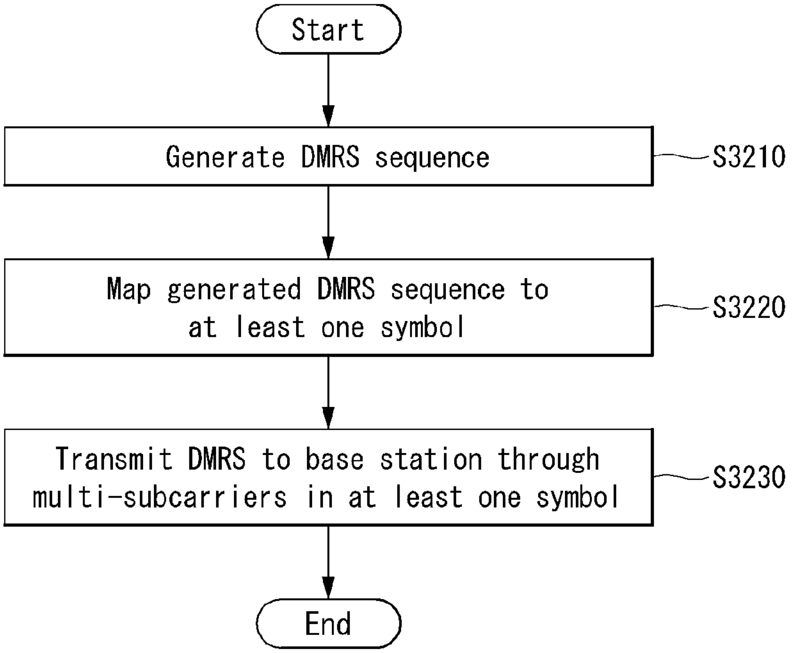
【Figure 33】
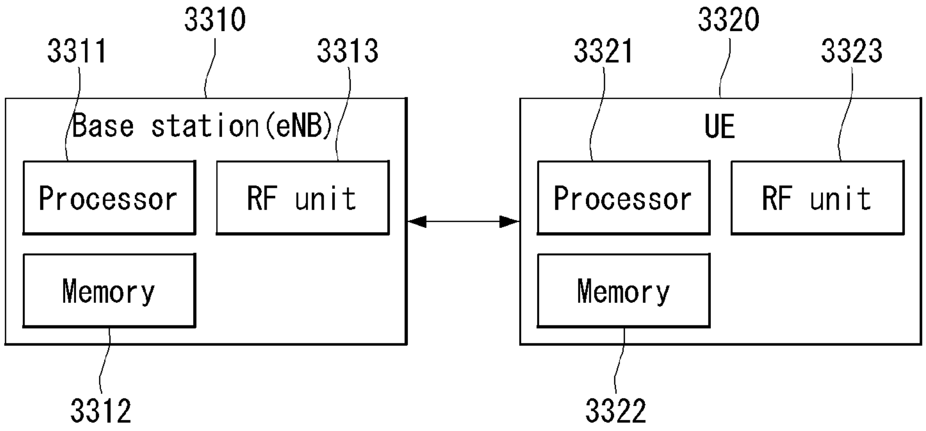

METHOD FOR TRANSMITTING DEMODULATION REFERENCE SIGNAL IN WIRELESS COMMUNICATION SYSTEM FOR SUPPORTING NARROWBAND IOT, AND DEVICE THEREFOR

This application is a continuation application of U.S. patent application Ser. No. 16/082,886, filed on Sep. 6, 2018, which is the National Stage filing under 35 U.S.C. 371 of International Application No. PCT/KR2017/002438, filed on Mar. 7, 2017, which claims the benefit of U.S. Provisional Application No. 62/304,338 filed on Mar. 7, 2016, U.S. Provisional Application No. 62/318,764 filed on Apr. 6, 2016, U.S. Provisional Application No. 62/320,628 filed on Apr. 11, 2016, U.S. Provisional Application No. 62/321,259 filed on Apr. 12, 2016, U.S. Provisional Application No. 62/321,749 filed on Apr. 13, 2016 and U.S. Provisional Application No. 62/321,801 filed on Apr. 13, 2016, the contents of which are all hereby incorporated by reference herein in their entirety.

TECHNICAL FIELD

The present invention relates to a wireless communication system supporting narrowband IoT (Internet of Things), and more particularly to a method for transmitting a demodulation reference signal (DMRS) in a wireless communication system supporting narrowband IoT and a device therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of this specification is to provide a method for configuring a DMRS considering a single tone transmission or a multi-tone transmission in an NB-IoT system.

Another object of this specification is to provide a method for generating and mapping a DMRS sequence upon single tone transmission in an NB-IoT system.

Another object of this specification is to provide a method for generating and mapping a DMRS sequence upon multi-tone transmission in an NB-IoT system.

Another object of this specification is to provide a method for determining a length and an initial state of a DMRS sequence in an NB-IoT system.

Technical problems to be solved by the present invention are not limited by the above-mentioned technical problems, and other technical problems which are not mentioned above can be clearly understood from the following description by those skilled in the art to which the present invention pertains.

Technical Solution

This specification provides a method for transmitting a demodulation reference signal (DMRS) in a wireless communication system supporting NB (Narrow-Band)-IoT (Internet of Things), the method performed by a User Equipment (UE) comprising generating a reference signal sequence used for demodulation; mapping the reference signal sequence to at least one symbol; and transmitting the demodulation reference signal (DMRS) to a base station through a single subcarrier in the at least one symbol, wherein the reference signal sequence is generated when the number of subcarriers within a resource unit defined in the NB-IoT is 1, wherein the resource unit is defined as consecutive SC-FDMA (Single Carrier-Frequency Division Multiplexing Access) symbols in a time domain and consecutive subcarriers in a frequency domain, wherein the reference signal sequence is generated using a specific sequence generated based on an m-sequence, and wherein a cint value of a second m-sequence used in the generation of the specific sequence is 35.

Furthermore, in this specification, a length of the reference signal sequence is determined based on the number of slots included in the resource unit.

Furthermore, in this specification, the number of slots included in the resource unit is 16, and the number of SC-FDMA symbols included in the slot is 7.

Furthermore, in this specification, the at least one SC-FDMA symbol is a fourth SC-FDMA symbol.

Furthermore, in this specification, a subcarrier spacing of the single subcarrier is 3.75 kHz or 15 kHz.

Furthermore, in this specification, $\pi/2$-BPSK modulation or $\pi/4$-QPSK modulation is applied to a transmission of the single subcarrier.

Furthermore, in this specification, the specific sequence is a gold sequence, and the specific sequence is initialized each time a new transmission starts.

This specification also provides a method for transmitting a demodulation reference signal (DMRS) in a wireless communication system supporting NB (Narrow-Band)-IoT (Internet of Things), the method performed by a User Equipment (UE) comprising generating a reference signal sequence used for demodulation; mapping the reference signal sequence to at least one symbol; and transmitting the demodulation reference signal (DMRS) to a base station through multi-subcarriers in the at least one symbol, wherein the reference signal sequence is generated when the number of subcarriers within a resource unit defined in the NB-IoT is greater than 1, and wherein the resource unit is defined as consecutive SC-FDMA (Single Carrier-Frequency Division Multiplexing Access) symbols in a time domain and consecutive subcarriers in a frequency domain.

Furthermore, in this specification, the number of subcarriers within the resource unit defined in the NB-IoT is 3.

Furthermore, in this specification, the number of multi-subcarriers is 3.

Furthermore, in this specification, when an index of a base sequence used in the generation of the reference signal sequence is 7, $\varphi(0)$, $\varphi(1)$ and $\varphi(2)$ used for the base sequence are 1, 1, and $-1$, respectively.

Furthermore, in this specification, the number of subcarriers within the resource unit defined in the NB-IoT is 6.

Furthermore, in this specification, the number of multi-subcarriers is 6.

Furthermore, in this specification, the number of indexes of the base sequence used in the generation of the reference signal sequence is 14.

This specification also provides a User Equipment (UE) for transmitting a demodulation reference signal (DMRS) in a wireless communication system supporting NB (Narrow-Band)-IoT (Internet of Things), the UE comprising a Radio Frequency (RF) unit for transmitting and receiving a radio signal, and a processor for controlling the RF unit, wherein the processor controls to generate a reference signal sequence used for demodulation, map the reference signal sequence to at least one symbol, and transmit the demodulation reference signal (DMRS) to the base station through a single subcarrier in the at least one symbol, wherein the reference signal sequence is generated when the number of subcarriers within a resource unit defined in the NB-IoT is 1, wherein the resource unit is defined as consecutive SC-FDMA (Single Carrier-Frequency Division Multiplexing Access) symbols in a time domain and consecutive subcarriers in a frequency domain, wherein the reference signal sequence is generated using a specific sequence generated based on an m-sequence, and wherein a cint value of a second m-sequence used in the generation of the specific sequence is 35.

Advantageous Effects

This specification has an effect capable of efficiently performing uplink channel estimation using a DMRS in an NB-IoT system by newly defining configuration of a narrowband DMRS in the NB-IoT system.

This specification also has an effect capable of reducing DMRS interference between contiguous cells by generating a reference signal sequence used for a DMRS using a gold sequence having a lowest cross correlation value.

This specification also has an effect capable of maximizing a DMRS performance by excluding a sequence having a highest Cubic Metric (CM) value from a reference signal sequence used for a DMRS.

This specification also has an effect capable of reducing cross correlation between multiple DMRS sequences using the same tone between cells by mapping a DMRS sequence for single tone transmission to a time domain, thereby reducing an impact of inter-cell interference.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, that are included to provide a further understanding of the invention and are incorporated in and constitute a part of this specification, illustrate embodiments of the invention and together with the description serve to explain various principles of the invention.

FIG. 2 illustrates a resource grid for one downlink slot in a wireless communication system to which the present invention is applicable.

FIG. 3 illustrates a structure of a downlink subframe in a wireless communication system to which the present invention is applicable.

FIG. 4 illustrates a structure of an uplink subframe in a wireless communication system to which the present invention is applicable.

FIG. 5 illustrates a configuration of a general multi-input/output antenna (MIMO) communication system.

FIG. 6 illustrates a channel from a plurality of transmission antennas to a single reception antenna.

FIG. 19 illustrates an example of an uplink resource grid for NB-IoT to which a method proposed by this specification is applicable.

FIG. 20 illustrates an example of a method for generating a DMRS sequence proposed by this specification.

FIG. 21 illustrates another example of a method for generating a DMRS sequence proposed by this specification.

FIG. 22 illustrates another example of a method for generating a DMRS sequence proposed by this specification.

FIG. 23 illustrates another example of a method for generating a DMRS sequence proposed by this specification.

FIG. 25 illustrates another example of a method for generating a DMRS sequence proposed by this specification.

FIG. 26 illustrates an example of an initial state of a DMRS sequence proposed by this specification.

FIG. 28 illustrates CM result values for a base sequence of DMRSs.

FIG. 29 illustrates an example of a method for generating a DMRS sequence for multi-tone transmission proposed by this specification.

FIG. 30 illustrates resource region mapping of a DMRS sequence for multi-tone transmission proposed by this specification.

FIG. 31 illustrates an example of a method for transmitting and receiving DMRS of NB-IoT proposed by this specification.

FIG. 32 illustrates another example of a method for transmitting and receiving DMRS of NB-IoT proposed by this specification.

FIG. 33 is a block diagram of a configuration of a wireless communication device according to an embodiment of the present invention.

MODE FOR INVENTION

Figure 1:
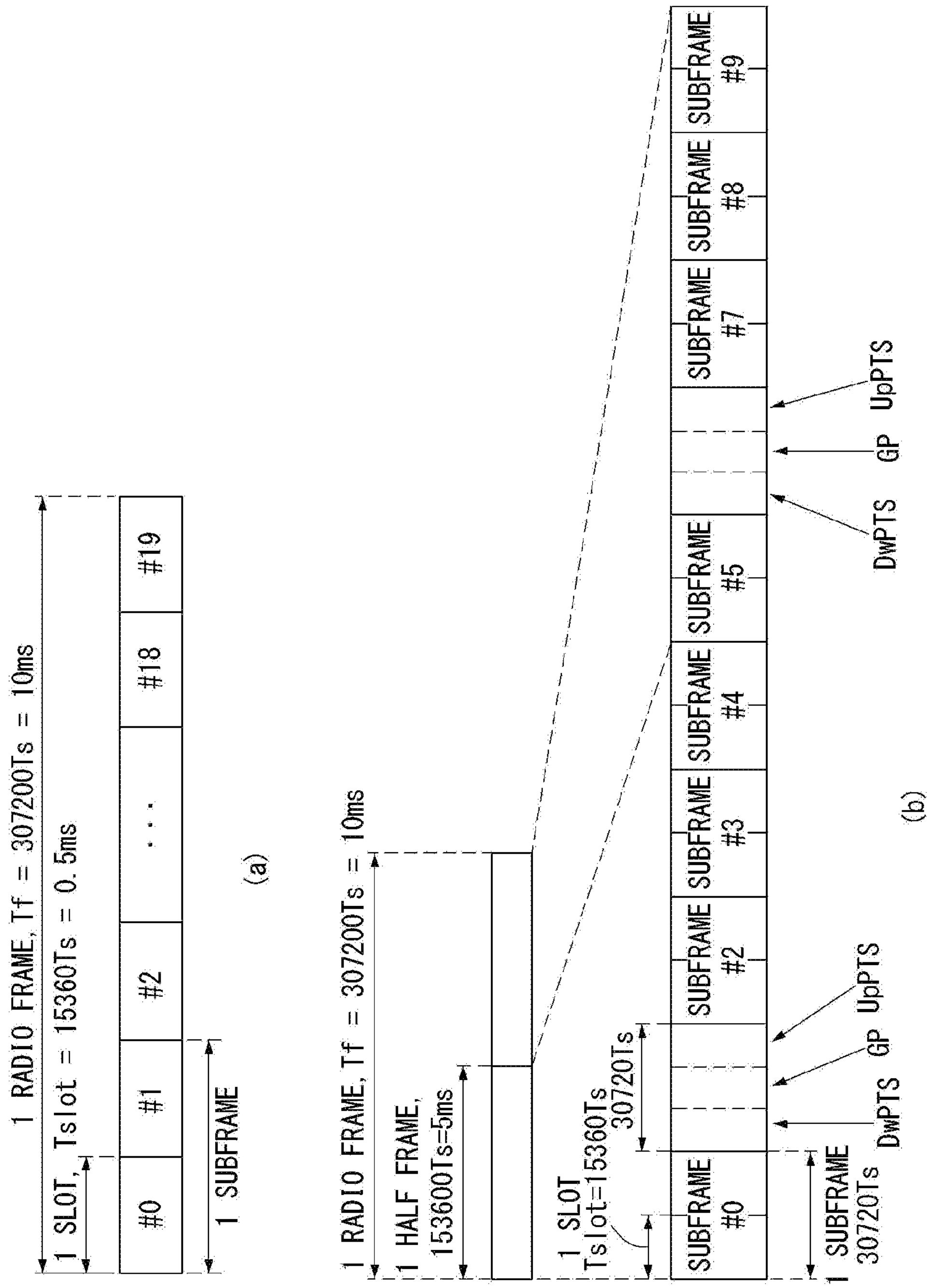
FIG. 1 illustrates a structure of a radio frame in a wireless communication system to which the present invention is applicable.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of T_s=1/(15000*2048). Downlink and uplink transmission includes a radio frame having a period of T_f=307200*T_s=10 ms.

FIG. 1(*a*) illustrates the structure of a type 1 radio frame. The type 1 radio frame may be applied to both full duplex and half duplex FDD.

The radio frame includes 10 subframes. One radio frame includes 20 slots of T_slot=15360*T_s=0.5 ms in length. 0 to 19 indices are assigned to the respective slots. One subframe includes consecutive 2 slots in the time domain, and a subframe i includes a slot 2*i* and a slot 2*i*+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(*b*) shows a frame structure type 2.

The frame structure type 2 includes two half frames, each having a length of 153600*T_s=5 ms. Each half frame includes 5 subframes, each having a length of 30720*T_s=1 ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2*i* and a slot 2*i*+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | DwPTS | UpPTS: Normal cyclic prefix in uplink | UpPTS: Extended cyclic prefix in uplink | DwPTS | UpPTS: Normal cyclic prefix in uplink | UpPTS: Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 2 is a diagram illustrating a resource grid for one downlink slot in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$S=[s_1,s_2, \ldots ,s_{N_T}]^T \quad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2, \ldots ,\hat{s}_{N_T}]^T=[P_1S_1,P_2S_2, \ldots ,P_{N_T}S_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2, \ldots ,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2}, \ldots ,h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Additive white Gaussian noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2, \ldots ,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H)\le\min(N_T,N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a “rank” for MIMO transmission indicates the number of paths through which signals may be independently transmitted at a specific point of time and a specific frequency resource. The “number of layers” indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called “DL CCs”) and the number of uplink CCs (hereinafter called “UL CCs”) are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

Figure 7:
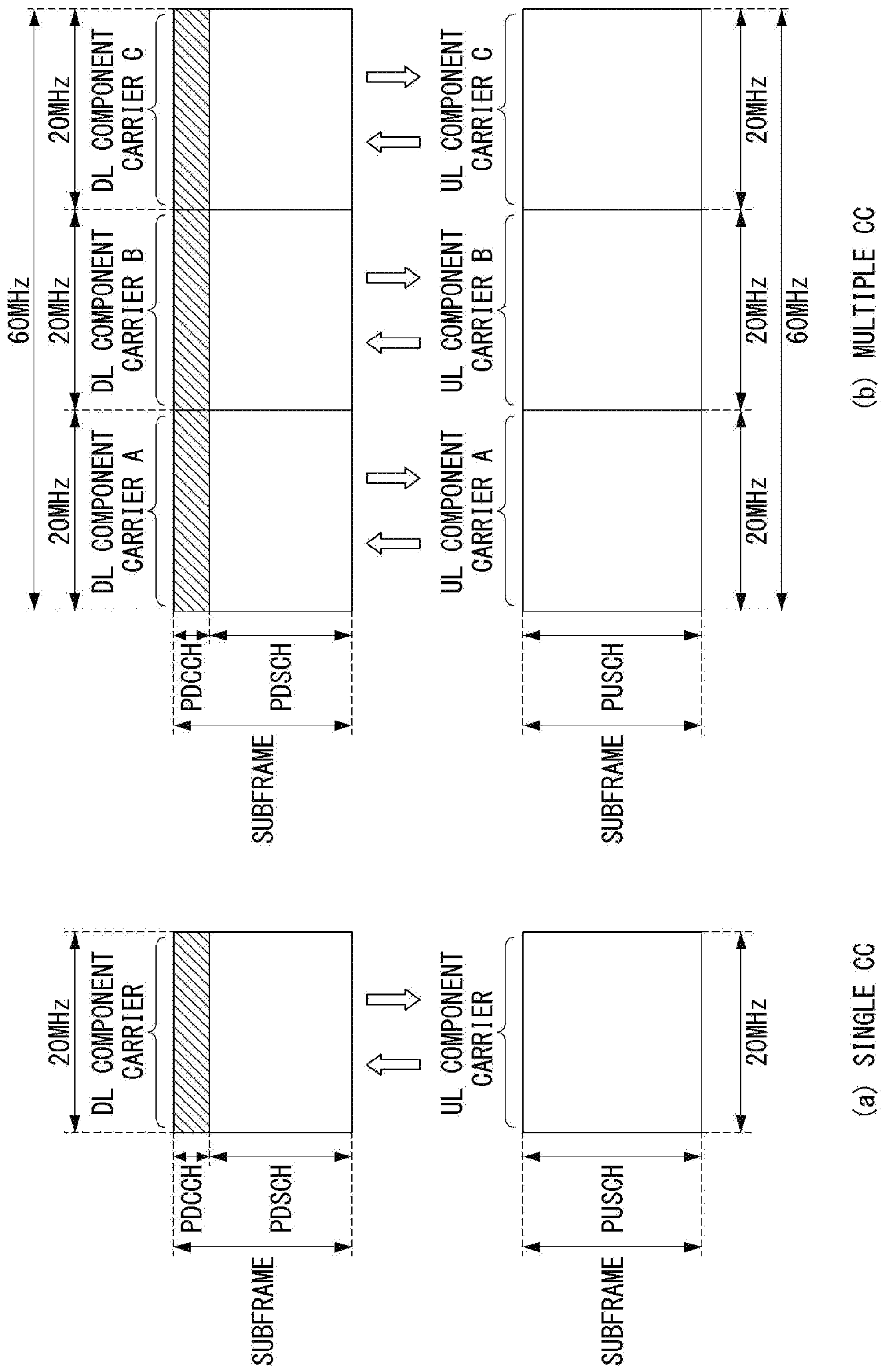
FIG. 7 illustrates an example of component carriers and a carrier aggregation in a wireless communication system to which the present invention is applicable.

FIG. 7 shows an example of component carriers and a carrier aggregation in a wireless communication system to which an embodiment of the present invention may be applied.

FIG. 7(*a*) illustrates a structure of a single carrier used in an LTE system. A CC includes a DL CC and an UL CC. One component carrier may have a frequency range of 20 MHz.

FIG. 7(*b*) illustrates a structure of a carrier aggregation used in an LTE-A system. FIG. 7(*b*) illustrates an example in which three component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Figure 8:
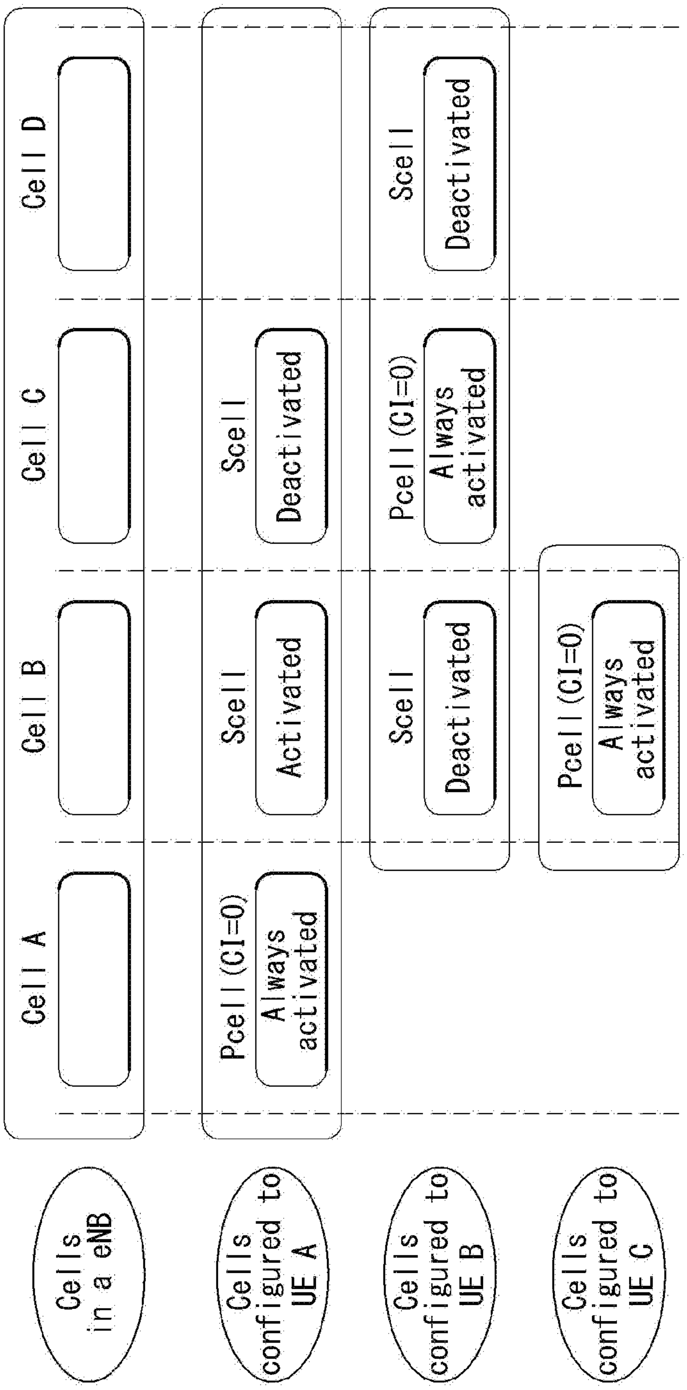
FIG. 8 illustrates an example of the classification of cells of a system supporting a carrier aggregation.

FIG. 8 is a diagram showing the classification of cells of a system supporting a carrier aggregation.

Referring to FIG. 8, a configured cell is a cell that belongs to cells of an eNB and that may be subjected to a carrier aggregation based on a measurement report as in FIG. 7, and may be configured for each UE. In the configured cell, resources for ACK/NACK transmission for PDSCH transmission may have been previously reserved. An activated cell is a cell that belongs to configured cells and that is configured to actually transmit a PDSCH/PUSCH, and performs channel state information (CSI) report for PDSCH/PUSCH transmission and sounding reference signal (SRS) transmission. A deactivated cell is a cell configured to not perform PDSCH/PUSCH transmission in response to a command from an eNB or a timer operation, and may stop CSI report and SRS transmission.

Synchronization Signal/Sequence (SS)

An SS includes a primary (P)-SS and a secondary (S)-SS, and corresponds to a signal used upon performing the cell search.

Figure 9:
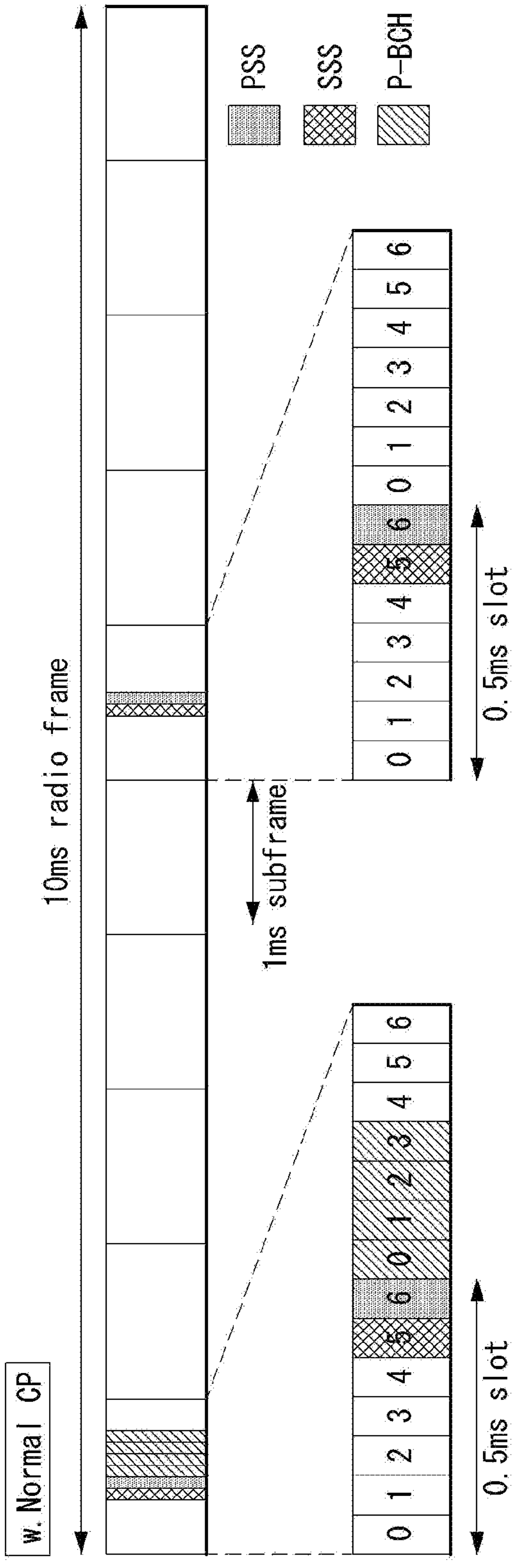
FIG. 9 illustrates a frame structure used for SS transmission in a system using a normal cyclic prefix (CP).
Figure 10:
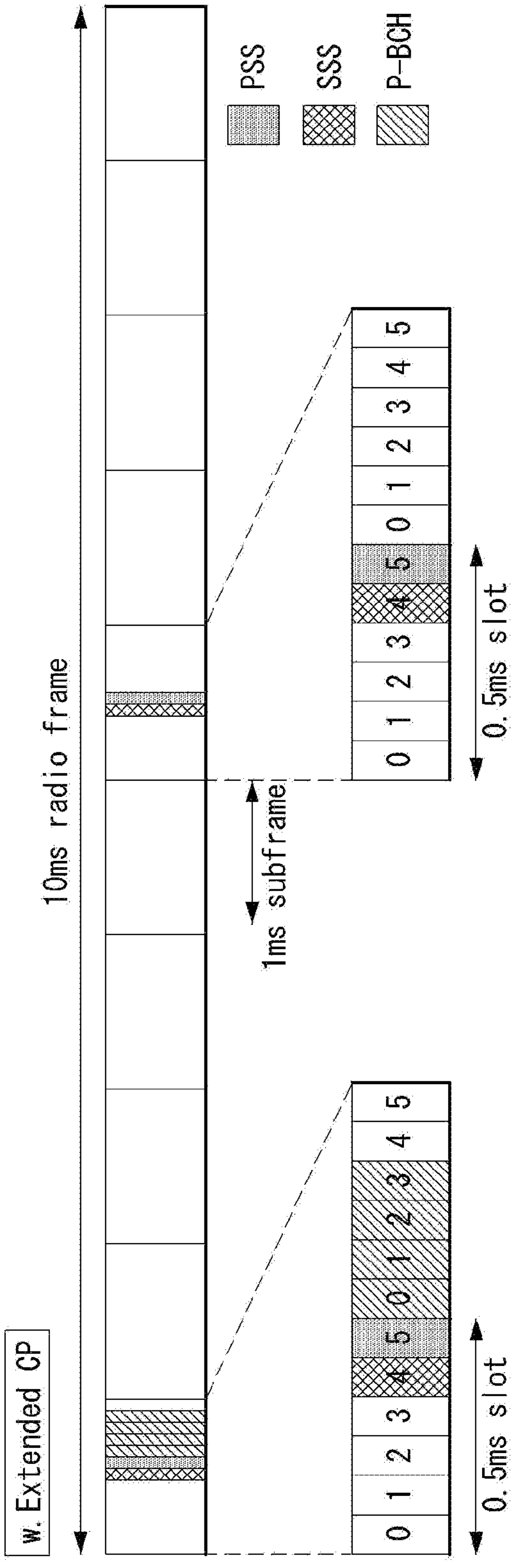
FIG. 10 illustrates a frame structure used for SS transmission in a system using an extended CP.

FIG. 9 is a diagram showing a frame structure used for SS transmission in a system using a normal cyclic prefix (CP). FIG. 10 is a diagram showing a frame structure used for SS transmission in a system using an extended CP.

An SS is transmitted in the second slots of a subframe No. 0 and subframe No. 5 by taking into consideration 4.6 ms, that is, the frame length of a global system for mobile communications (GSM), for the easiness of inter-radio access technology (TAT) measurement. A boundary for the corresponding radio frame may be detected through an S-SS. A P-SS is transmitted in the last OFDM symbol of a corresponding slot, and an S-SS is transmitted in an OFDM symbol right before the P-SS.

An SS may transmit a total of 504 physical layer cell IDs through three P-SSs and 168 S-SS combinations. Furthermore, the SS and a PBCH are transmitted within 6 RBs in the middle of a system bandwidth so that a UE can detect or decode them regardless of a transmission bandwidth.

In a transmit diversity method of an SS, only one antenna port is used and the method is not separately defined in the standard. That is, in the transmit diversity method of an SS, single antenna transmission or a transmission method (e.g., precoder vector switching (PVS), time-switched transmit diversity (TSTD) and cyclic-delay diversity (CDD)) transparent to a UE may be used.

1. P-SS Code

A Zadoff-Chu (ZC) sequence of a length 63 is defined in a frequency domain and may be used as the sequence of a P-SS. The ZC sequence is defined by Equation 12, and a sequence element n=31 corresponding to a DC subcarrier is punctured. In Equation 12, N_zc=63.

$$d_u(n) = e^{-j\frac{\pi un(n+1)}{N_{ZC}}} \quad \text{[Equation 12]}$$

The remaining nine subcarriers of 6 RBs (=7 subcarriers) located in the middle of a frequency domain are always transmitted as a value of 0, and facilitate a filter design for performing synchronization. In order to define a total of three P-SSs, in Equation 12, values of u=25, 29 and 34 may be used. In this case, 29 and 34 have a conjugate symmetry relation, and thus two correlations may be performed at the same time. In this case, the conjugate symmetry means Equation 13. A one-shot correlator for u=29 and 34 can be implemented using such a characteristic, thereby being capable of reducing a total computational load by about 33.3%.

$$d_u(n)=(-1)^n(d_{N_{ZC}-u}(n)),\ \text{when } N_{ZC} \text{ is even number.}$$

$$d_u(n)=(d_{N_{ZC}-u}(n)),\ \text{when } N_{ZC} \text{ is } \textit{odd} \text{ number.} \quad \text{[Equation 13]}$$

2. S-SS Code

In a sequence used for an S-SS, two m-sequences of a length 31 are interleaving-joined, and the two sequences are combined to transmit 168 cell group IDs. The m-sequence, that is, the sequence of the S-SS, is robust against a frequency selective environment and can reduce a computational load through fast m-sequence transform using Hadamard transform. Furthermore, to configure an S-SS using two short codes has been proposed to reduce a computational load of a UE.

Figure 11:
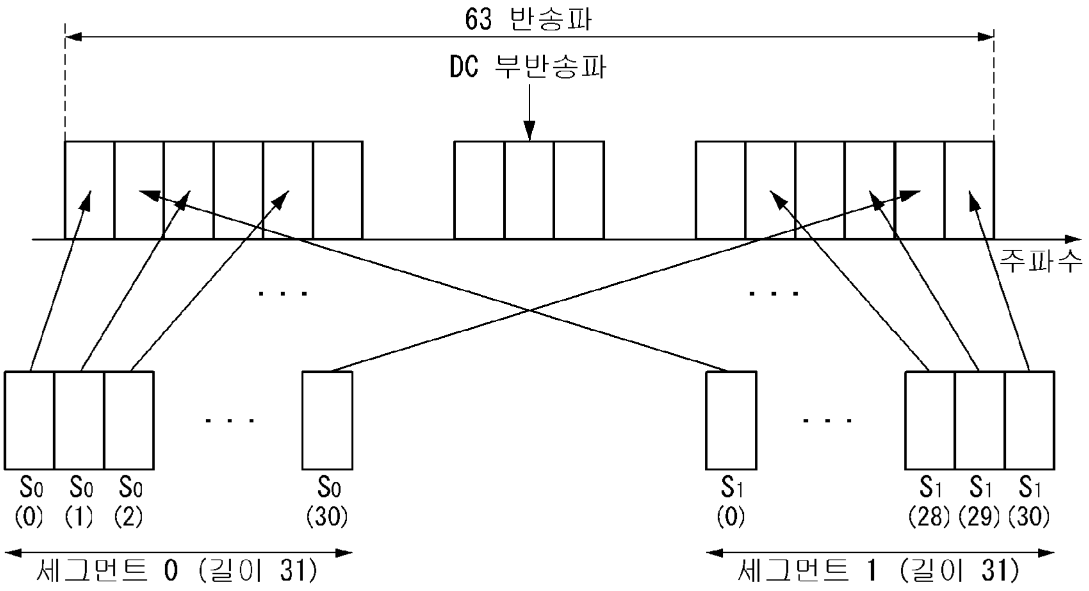
FIG. 11 illustrates that two sequences in a logical region are interleaved and mapped in a physical region.

FIG. 11 is a diagram illustrating that two sequences in a logical region are interleaved and mapped in a physical region.

Referring to FIG. 11, assuming that two m-sequences used to generate an S-SS code are defined as an S1 and an S2, respectively, if the S-SS of a subframe 0 transmits a cell group ID through two combinations of (S1, S2), the S-SS of a subframe 5 is swapped into (S2, S1) and transmitted, thereby being capable of determining a 10-ms frame boundary. In this case, the S-SS code uses a generation polynomial of x^5+x^2+1, and a total of 31 codes may be generated through different circular shifts.

In order to improve reception performance, P-SS-based different two sequences are defined and scrambled to an S-SS. In this case, an S1 and an S2 may be scrambled in different sequences. Thereafter, an S1-based scrambling code is defined and scrambling may be performed on the S2. In this case, the code of the S-SS is exchanged in a 5 ms unit, but the P-SS-based scrambling code is not exchanged. The P-SS-based scrambling code is defined as a sixth-circular shift version according to a P-SS index in an m-sequence generated from the generation polynomial of x^5+x^2+1. The S1-based scrambling code is defined as an eight-circular shift version based on the index of the S1 in an m-sequence generated from a polynomial of x^5+x^4+x^2+x^1+1.

The following contents illustrate a synchronization criteria of an LTE system.

- a UE may monitor downlink link quality based on a cell-specific reference signal in order to detect downlink radio link quality of a PCell.
- a UE may estimate downlink radio link quality for the purpose of monitoring downlink radio link quality of a PCell and compare it with Q_out and Q_in, that is, thresholds.
- the threshold Q_out may be defined as a level in which a downlink radio link is not certainly received, and may correspond to a block error rate of 10% of PDCCH transmission of the hypothesis in which a PCFICH is taken into consideration along with transmission parameters.
- the threshold Q_in may be defined as a downlink radio link quality level in which a downlink radio link can be received more certainly compared to Q_out, and may correspond to a block error rate of 2% of PDCCH transmission in the hypothesis in which a PCFICH is taken into consideration along with transmission parameters.

Narrow Band (NB) LTE Cell Search

In NB-LTE, cell search may comply with the same rule as that in LTE, but another sequence design may be properly changed in order to improve the cell search ability.

Figure 12:
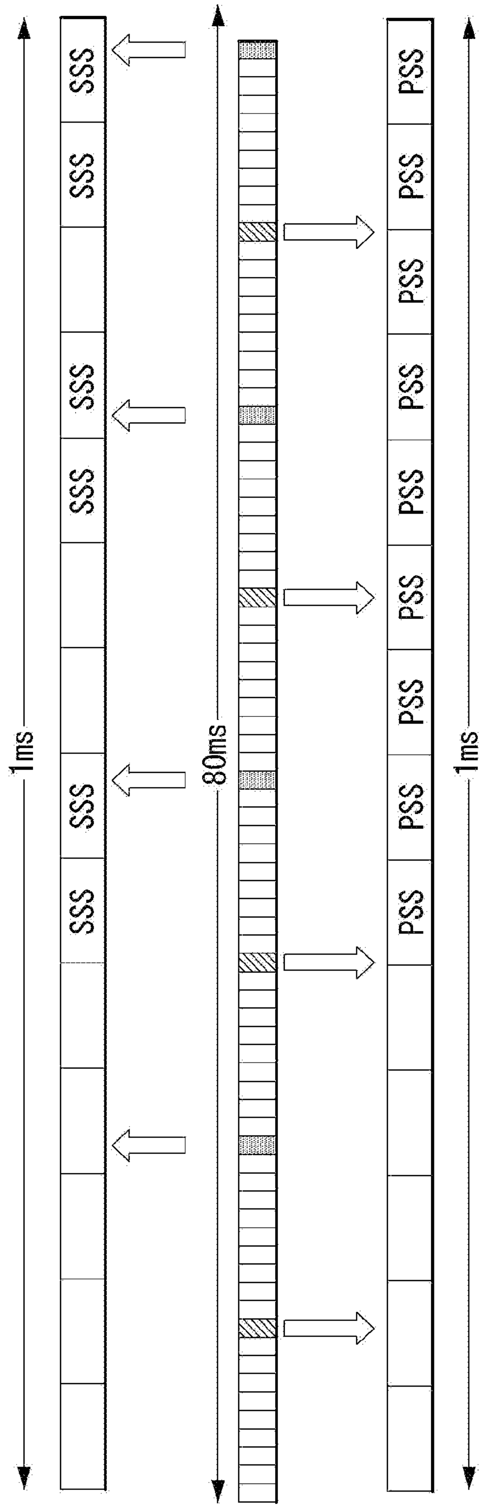
FIG. 12 illustrates a frame structure to which an M-PSS and an M-SSS are mapped.

FIG. 12 is a diagram showing a frame structure to which an M-PSS and an M-SSS are mapped. In this specification, the M-PSS denotes a P-SS in NB-LTE, and the M-SSS denotes an S-SS in NB-LTE. The M-PSS may also be called an 'NB-PSS', and the M-SSS may also be called an 'NB-SSS.'

Referring to FIG. 12, in the case of the M-PSS, one primary synchronization sequence/signal may be used. The (M-)PSS may span up to a nine-OFDM symbol length, and may be used to determine subframe timing in addition to an accurate frequency offset. This may be construed as a meaning that a UE may use the M-PSS to obtain time synchronization and frequency synchronization with an eNB. In this case, the (M-)PSS may be consecutively located in a time domain.

In the case of the M-SSS, a secondary synchronization sequence may span up to six-OFDM symbol length, and may be used to a cell ID and the timing of an M-frame. This may be construed as a meaning that a UE may use the M-SSS to detect the ID of an eNB. 504 different (M-)SSSs may be designed to support the same number as the number of cell ID groups in LTE.

From the design of FIG. 12, the M-PSS and the M-SSS are repeated every average 20 ms and may be present/generated four times within an 80 ms block. In subframes including synchronization sequences, an M-PSS occupies the last nine OFDM symbols. The M-SSS may occupy sixth, seventh, tenth, eleventh, thirteenth and fourteenth OFDM symbols in the case of a normal CP, and may occupy fifth, sixth, ninth, eleventh and twelfth OFDM symbols in the case of an extended CP.

The nine OFDM symbols occupied by the M-PSS may be selected to provide support for in-band deployment between LTE carriers. The reason for this is that in a hosting LTE system, the first three OFDM symbols of the nine OFDM symbols are used to carry a PDCCH and a subframe includes at least 12 OFDM symbols (in the case of an extended CP).

In the hosting LTE system, a cell-specific reference signal (CRS) is transmitted. Resource elements corresponding to an M-PSS may be punctured in order to avoid a collision. In NB-LTE, specific locations of an M-PSS/M-SSS may be determined to avoid a collision with many legacy LTE signals, such as a PDCCH, PCFICH, PHICH and/or an MBSFN.

The design of a synchronization sequence in NB-LTE may be different with respect to LTE. This may be performed to achieve comprise between reduced memory consumption and faster synchronization in a UE. Since four repetitions are performed in an 80 ms interval, a slight design change of an M-SSS may be necessary in the 80 ms interval in order to solve timing uncertainty.

Structure of M-PSS and M-SSS

In LTE, the structure of a PSS permits the design of low complexity for a timing and frequency offset measurement device, and an SSS is designed to obtain frame timing and to support specific 504 cell IDs.

In the case of the in-band and guard-band of LTE, the deployment of a CP in NB-LTE may be selected to be matched with the CP of a hosting system. In the case of standalone, an extended CP may be used to comply with a transmitter pulse form for applying the least an impact on a hosting system (e.g., GSM).

One M-PSS may be specified in N-LTE of LTE. In a PSS synchronization procedure of LTE, a specific number of frequency estimations for a PSS may be used to coarsely estimate symbol timing and a frequency offset. In NB-LTE, the adoption of such a procedure can improve the processing complexity of a receiver as a plurality of frequency hypotneses is used. In order to solve such a problem, the sequence resembling of a Zadoff-Chu sequence differentially coded in the time domain may be proposed for an M-PSS. Differential decoding may be performed during receiver processing because differential encoding is performed in a transmission step. As a result, a frequency offset may be converted into a fixed phase offset for corresponding symbols from contiguous rotation for the symbols.

Figure 13:
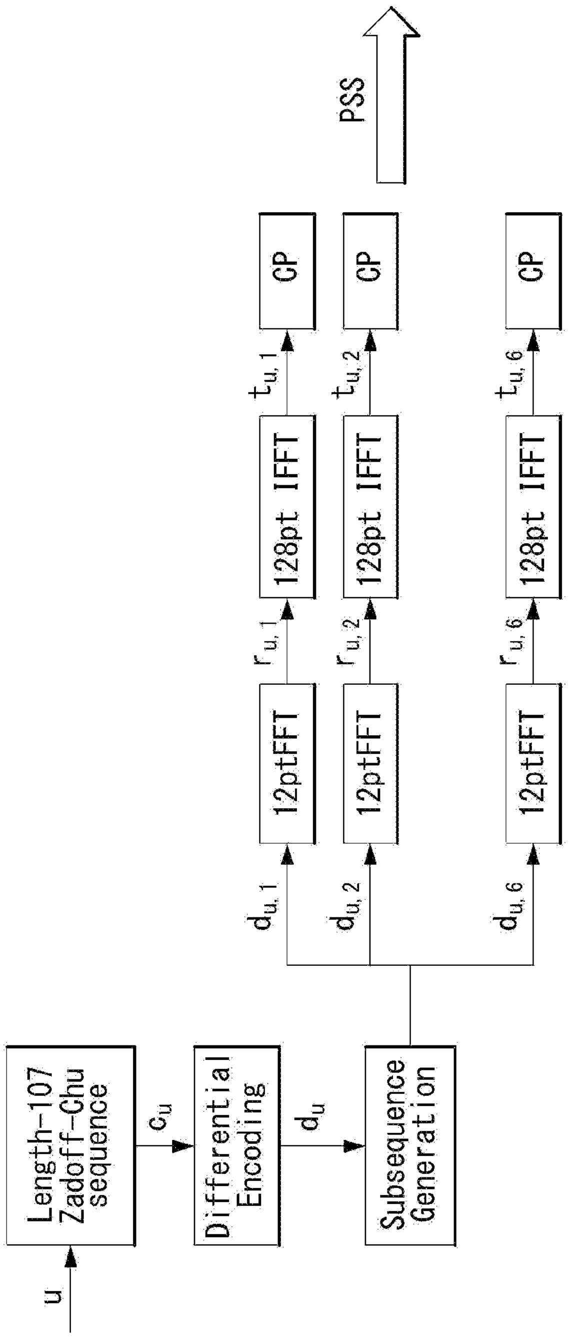
FIG. 13 illustrates a method of generating an M-PSS according to an embodiment of the present invention.

FIG. 13 is a diagram showing a method of generating an M-PSS according to an embodiment of the present invention.

Referring to FIG. 13, first, if a base sequence of a length 107 is started in order to generate an M-PSS, Equation 14 may be obtained.

$$c(n) = e^{-\frac{j\pi un(n+1)}{N}},\ n = \{0, 1, 2, \ldots, 106\} \qquad \text{[Equation 14]}$$

A base sequence c(n) may be differentially coded in order to obtain a d(n) sequence as in Equation 15.

$$d(n+1)=d(n)c(n),\ n=\{0,1,2, \ldots ,106\},\ d(0)=1, \qquad \text{[Equation 15]}$$

The d(n) sequence is separated into nine subsequence, and each subsequence has a length 12 and a sampling rate of 130 kHz. 120-point FFT is performed on each of the nine subsequences, and each sequence may be oversampled 128/12 times up to a sample rate of 1.92 MHz using 128 pieces of IFFT zero padding. As a result, each subsequence may be mapped to each of 12 subcarriers for nine OFDM symbols.

Each of the subsequences is mapped to one OFDM symbol and a total of the nine subsequences are present. Accordingly, an M-PSS may occupy all of the nine OFDM symbols. The entire length of the M-PSS may be 1234 (=(128+9)*9+1) if a normal CP of nine samples is used and may be 1440 if an extended CP is used.

An M-PSS to be used actually during transmission does not need to be identically generated each time using a complicated procedure in a transmitter/receiver. A complicated coefficient (i.e., t_u(n)) corresponding to the M-PSS may be generated offline and may be directly stored in the transmitter/receiver. Furthermore, although the M-PSS of 1.92 MHz is generated, an occupied bandwidth may be 180 kHz.

Accordingly, although the receiver performs a procedure related to time and frequency offset measurement using the M-PSS, the entire sampling rate of 192 kHz may be used. This can significantly reduce the complexity of the receiver in cell search.

When compared to LTE, a frequency from which an M-PSS is generated in NB-LTE cause some overhead compared to a PSS in LTE. More specifically, a synchronization sequence used in LTE occupies 2.86% of transmission resources, and a synchronization sequence used in NB-LTE occupies about 5.36% of all of resources. Such additional overhead has an effect in that memory consumption is reduced in addition to a synchronization time that leads to improved battery lifespan and a lower device price.

An M-SSS is designed in the frequency domain and occupies 12 subcarriers in each of 6 OFDM symbols. Accordingly, the number of resource elements dedicatedly allocated (dedicated) to the M-SSS may be 72. The M-SSS may include one ZC sequence of a 61 length padded with eleven '0's at the start point.

In the case of an extended CP, the first 12 symbols of an M-SSS may be discarded, and the remaining symbols may be mapped to valid OFDM symbols. Since the eleven '0's are present at the start point, only one symbol from the length 61 sequence may be discarded. The discard of the symbol causes slight deterioration of the correlation property of another SSS.

The cyclic shift of a sequence and a sequence for a different root may easily provide specific 504 cell IDs. When compared to a case where an M-sequence is used in LTE, the reason why a ZC sequence is used in NB-LTE is to reduce an error detection rate. Since a common sequence for two different cell ID groups is present, an additional procedure in LTE is required.

An M-PSS/M-SSS is generated four times in an 80 ms block, and thus the LTE design of an SSS cannot be used to provide accurate timing information within a corresponding block. The reason for this is that a special interleaving structure capable of determining only two locations is present. Accordingly, a scrambling sequence may be used on the upper side of a ZC sequence in order to provide information about frame timing. A 4-scrambling sequence may be necessary to determine four locations within the 80 ms block, which may have an influence on the acquisition of accurate timing.

Figure 14:
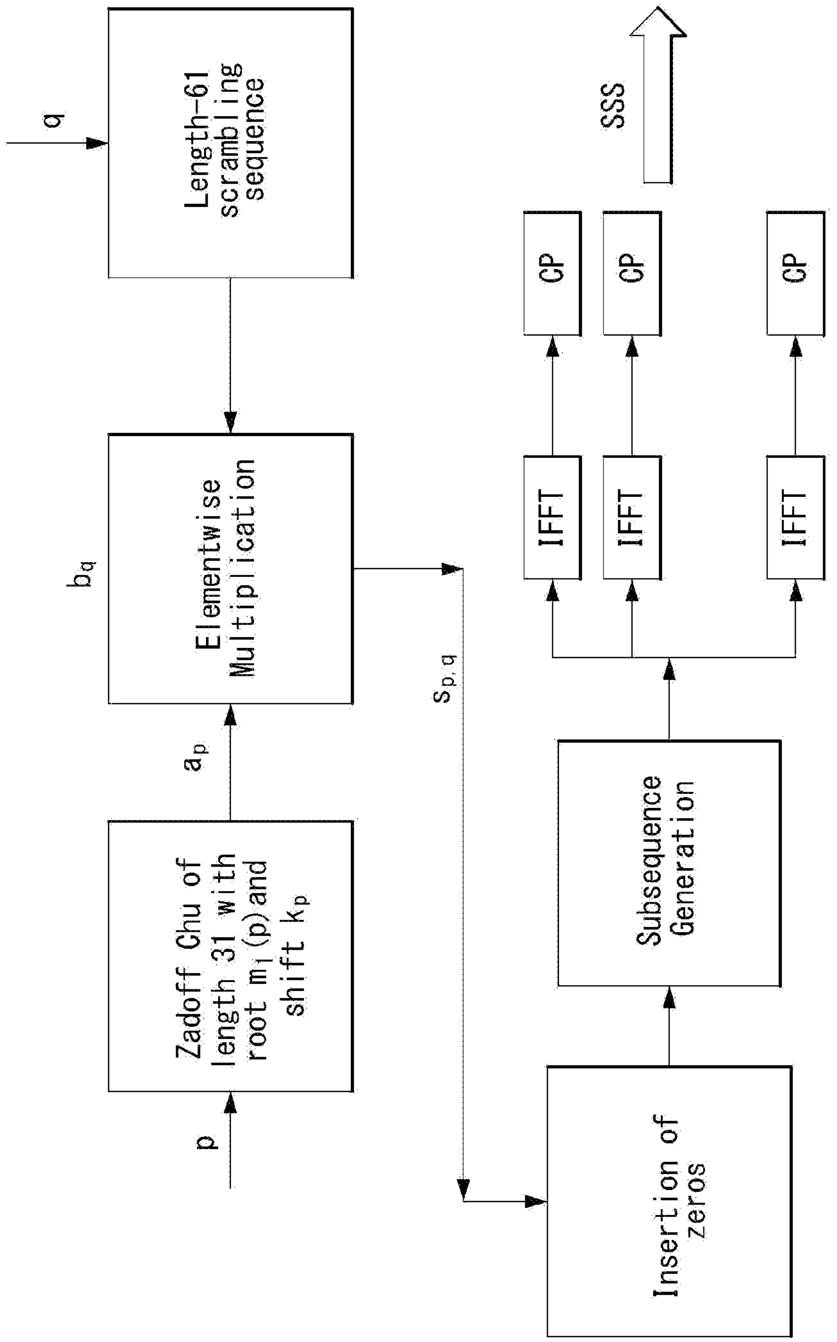
FIG. 14 illustrates a method of generating an M-SSS according to an embodiment of the present invention.

FIG. 14 is a diagram showing a method of generating an M-SSS according to an embodiment of the present invention.

Referring to FIG. 14, an M-SSS may be defined as s_p,q(n)=a_p(n)·b_q(n). In this case, p={0, 1, . . . , 503} indicates a cell ID, and q={0, 1, 2, 3} determines the location of the M-SSS (i.e., the number of M-SSSs within an 80 ms block recently generated prior to an SSS). Furthermore, a_p(n) and b_q(n) may be determined according to Equations 16 and 17.

$$a_p(n) = 0,\ n\{0-4.66-71\} \hookleftarrow$$
$$= a_p(n-k_p-5),\ n=\{5, 6, \ldots, 65\} \hookleftarrow \quad \text{[Equation 16]}$$

$$a_p(n) = e^{-\frac{j\pi m(p)n(n+1)}{61}},\ n=\{0, 1, \ldots, 61\} \leftarrow$$

$$b_q(n)=b(\mathrm{mod}(n-l_q,63))\ n=\{0,1, \ldots ,60\},q=\{0,1,2,3\},l_0=0,l_1=3,l_2=7,l_3=11$$

$$b(n=6)=\mathrm{mod}(b(n)+b(n+1),2),n=\{0,1, \ldots 55\},b(0)=1,b(m)=0,m=\{1,2,3,45\} \quad \text{[Equation 17]}$$

Referring to Equation 16, a_p(n) is a ZC sequence and may determine a cell ID group. m(p) and the cyclic shift k_p may be used to provide a specific cell ID. Referring to Equation 17, b_q(n) may be a scrambling sequence having the cyclic shift of the base sequence b_(n), and may be used to indicate the location of an M-SSS within an M-frame in order to obtain frame timing. The cyclic shift l_q may be determined depending on a q value.

An m(p) value for a specific p may be determined like m(p)=1+mod(p, 61), and a k_p value may be determined like k_p=7[p/61].

Figure 15:
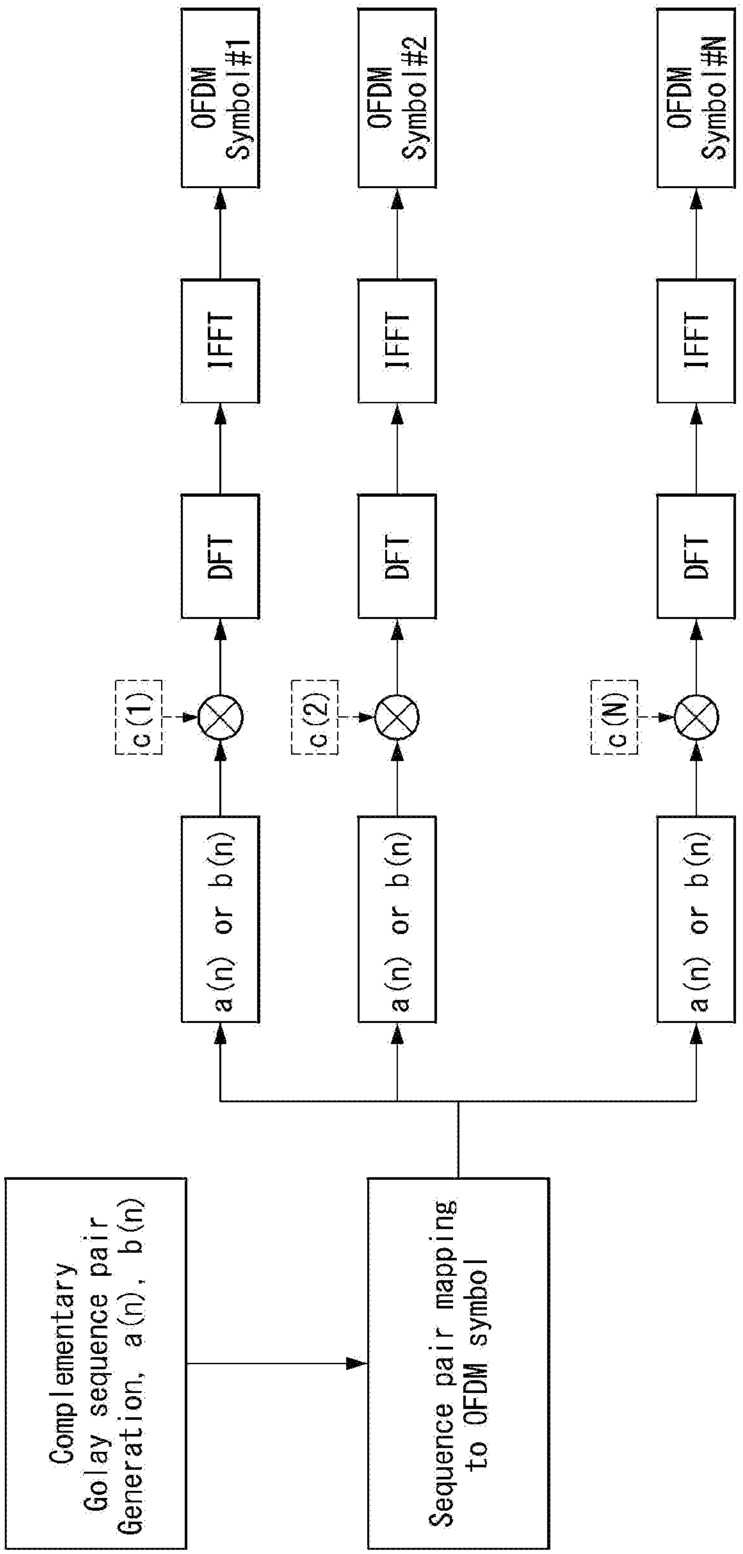
FIG. 15 illustrates an example of a method for implementing an M-PSS to which a method proposed by this specification is applicable.

FIG. 15 illustrates an example of a method for implementing an M-PSS to which a method proposed by this specification is applicable.

More specifically, FIG. 15 illustrates a method for generating an M-PSS using a complementary Golay sequence.

As shown in FIG. 15, CGS to be transmitted to each OFDM symbol is selected using a complementary Golay sequence pair (i.e., select a(n) or b(n)).

Next, in case of using a cover code, each of c(1) to c(N) may be multiplied by the CGS. If the cover code is not used, "1" may be added to all of c(n).

Subsequently, DFT and IFFT are performed on each symbol and are transmitted to each OFDM symbol on a time domain.

In addition, a sequence to be transmitted to each OFDM symbol may be generated even using a length-12 ZC sequence.

In this case, the M-PSS can be implemented by using the same method as the method applied to FIG. 15.

Operating System of NB-LTE System

Figure 16:
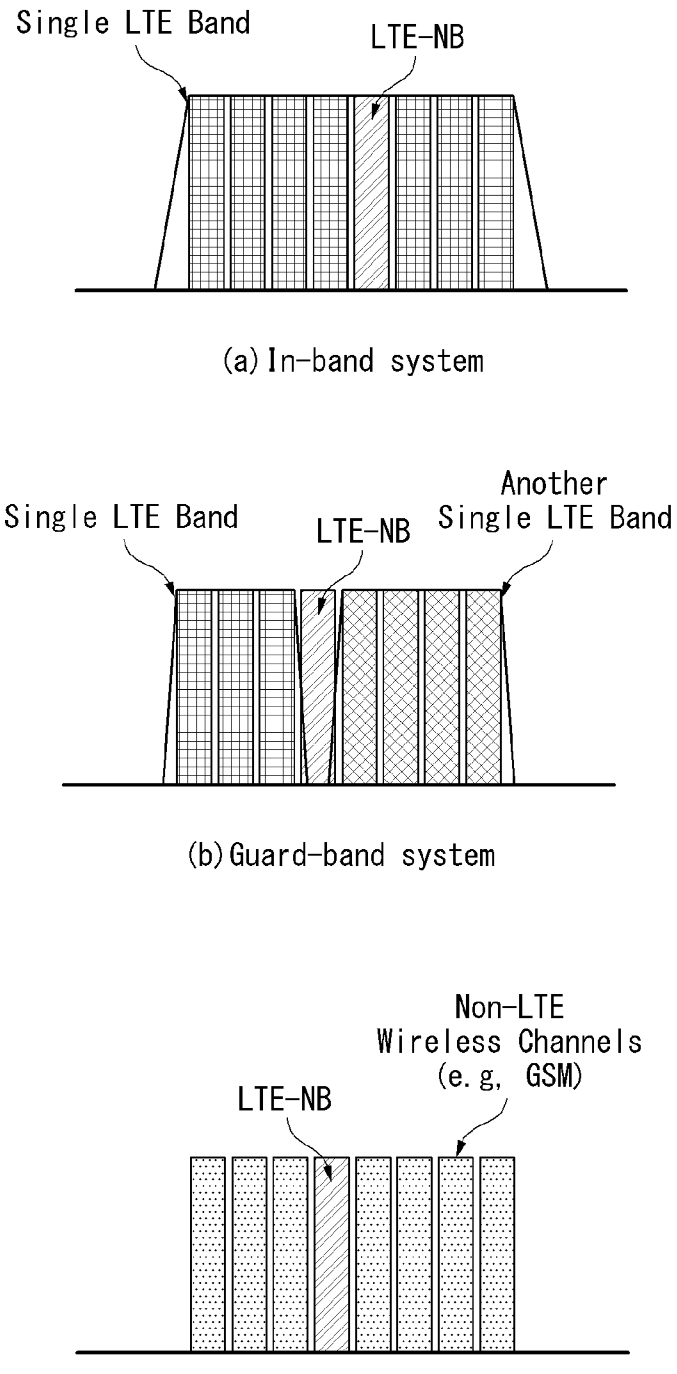
FIG. 16 illustrates an example of an operating system of an NB LTE system to which a method proposed by this specification is applicable.

FIG. 16 illustrates an example of an operating system of an NB LTE system to which a method proposed by this specification is applicable.

Specifically, FIG. 16(*a*) shows an in-band system, FIG. 16(*b*) shows a guard-band system, and FIG. 16(*c*) shows a standalone system.

The in-band system may be expressed as an in-band mode, the guard band system may be expressed as a guard band mode, and a standalone system may be expressed as a standalone mode.

The in-band system of FIG. 16(*a*) refers to a system or mode in which a specific 1 RB within a legacy LTE band is used for NB-LTE (or LTE-NB), and may be operated by allocating some resource blocks of an LTE system carrier.

The guard-band system of FIG. 16(*b*) refers to a system or mode in which NB-LTE is used in the space reserved for the guard band of a legacy LTE band, and may be operated by allocating the guard-band of an LTE carrier not used as a resource block in the LTE system.

A legacy LTE band has a guardband of at least 100 kHz at the last of each LTE band.

In order to use 200 kHz, two non-contiguous guardbands may be used.

The in-band system and the guard-band system show structures in which NB-LTE coexists within a legacy LTE band.

In contrast, the standalone system FIG. 16(*c*) refers to a system or mode configured independently of a legacy LTE band, and may be operated by separately allocating a frequency band (GSM carrier reallocated in the future) used in the GERAN.

Hereinafter, a NB-frame structure for 15 kHz or 3.75 kHz subcarrier spacing, to which a method proposed by this specification is applicable, is described.

A NB-frame structure for 15 kHz subcarrier spacing may be the same as a frame structure of a legacy system (LTE system).

Namely, 10 ms NB-frame may include ten 1 ms NB-subframes, and the 1 ms NB-subframe may include two 0.5 ms NB-slots.

Further, the 0.5 ms NB-slot may include 7 OFDM symbols.

In a NB-frame structure for 3.75 kHz subcarrier spacing, 10 ms NB-frame may include five 2 ms NB-subframes, and the 2 ms NB-subframe may include 7 OFDM symbols and one Guard Period (GP).

The 2 ms NB-subframe may also be expressed as NB-slot or NB-RU (resource unit), etc.

In a correspondence between the legacy LTE subframe structure and the subframe structure of 3.75 kHz, subframe (2 ms) of 3.75 kHz may correspond to two 1 ms subframes (or 1 ms TTI) of the legacy LTE.

Reference Signal (RS)

In a wireless communication system, a signal may be distorted during the transmission because data is transmitted through a radio channel. In order for a reception end to accurately receive a distorted signal, distortion of a received signal needs to be corrected using channel information. In order to detect channel information, a method for detecting channel information is mainly used using a method for transmitting a signal known to both a transmission side and a reception side and a degree of distortion of a signal when the signal is transmitted through a channel. The above-described signal is called a pilot signal or a reference signal (RS).

Recently, when most mobile communication systems transmit a packet, they use a method capable of improving efficiency of transmission/reception data by adopting multiple transmission antennas and multiple reception antennas instead of using one transmission antenna and one reception antenna that have been used so far. When data is transmitted or received using multiple input/output antennas, a channel state between the transmission antenna and the reception antenna has to be detected in order to accurately receive the signal. Thus, each transmission antenna needs to have an individual reference signal.

In the mobile communication system, the RS may be roughly classified into two types according to its purpose. There are an RS for the purpose of obtaining channel information and an RS used for data demodulation. Since the purpose of the former is to enable a UE to obtain channel information in the downlink, the former RS has to be transmitted over a wideband, and a UE has to be able to receive and measure the former RS even if the UE does not receive downlink data in a specific subframe. Further, the former RS is also used to measure handover, etc. The latter is an RS that is sent together with a corresponding resource when a base station sends a downlink, and a UE can perform channel estimation by receiving the corresponding RS and thus can modulate data. The latter RS has to be transmitted to a region where data is transmitted.

A downlink reference signal includes one common RS (CRS) for the acquisition of information about a channel state shared by all of UEs within a cell and measurement of handover, etc., and a dedicated RS (DRS) used for data demodulation for only a specific UE. Information for demodulation and channel measurement can be provided using such RSs. Namely, the DRS is used for only the data demodulation, and the CRS is used for two purposes of the channel information acquisition and the data demodulation.

The reception side (i.e., UE) measures a channel state from the CRS and feeds an indicator related to channel quality, such as a Channel Quality Indicator (CQI), a Precoding Matrix Index (PMI) and/or a Rank Indicator (RI), back to the transmission side (i.e., base station). The CRS is also called a cell-specific RS. On the other hand, a reference signal related to the feedback of Channel State Information (CSI) may be defined as a CSI-RS.

The DRS may be transmitted through resource elements if data on a PDSCH needs to be demodulated. The UE may receive through a higher layer whether or not the DRS is present, and is valid only when a corresponding PDSCH has been mapped. The DRS may also be called a UE-specific RS or a demodulation RS (DMRS).

Figure 17:
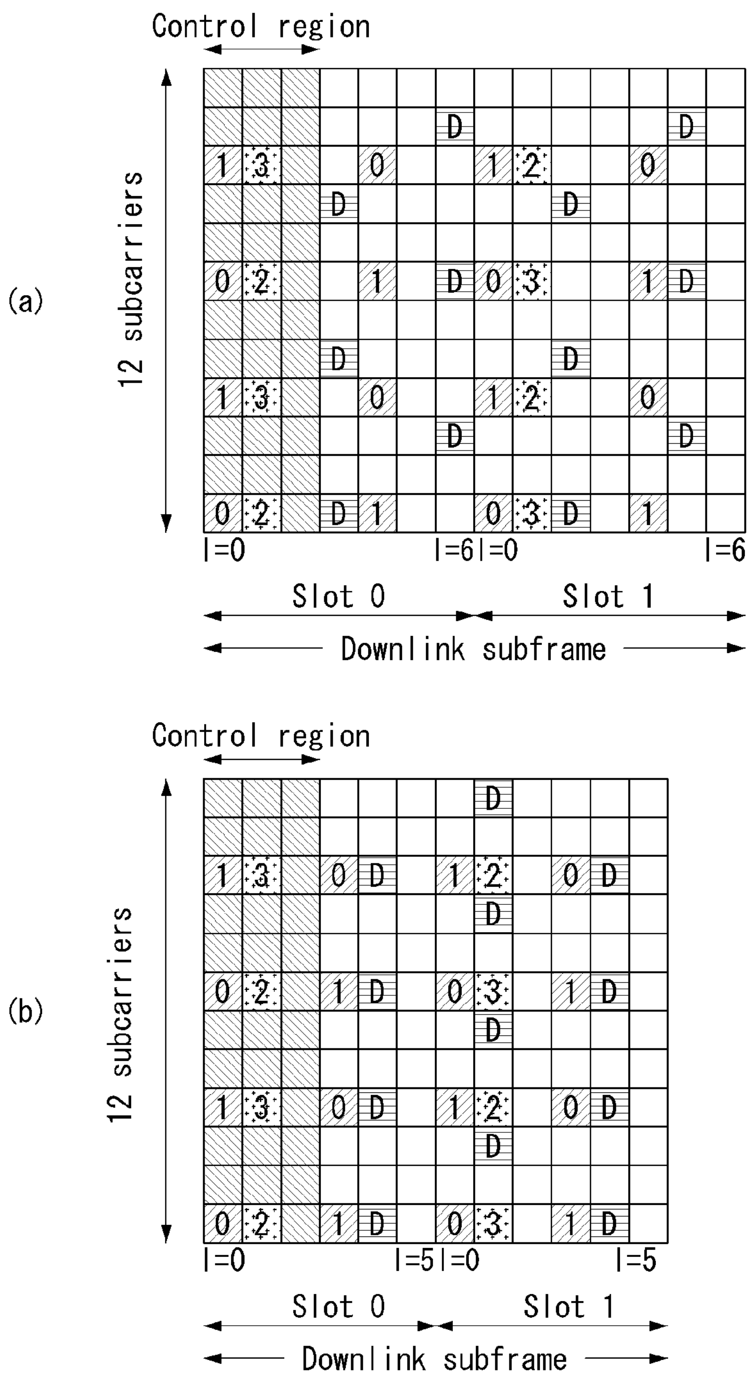
FIG. 17 illustrates a reference signal pattern mapped to a downlink resource block pair in a wireless communication system to which the present invention is applicable.

FIG. 17 illustrates a reference signal pattern mapped to a downlink resource block pair in a wireless communication system to which the present invention is applicable.

Referring to FIG. 17, a downlink resource block pair, i.e., a unit in which a reference signal is mapped may be represented as one subframe in a time domain×12 subcarriers in a frequency domain. Namely, one resource block pair on a time axis (x-axis) has a length of 14 OFDM symbols in the case of normal Cyclic Prefix (CP) (see FIG. 17(*a*)) and has a length of 12 OFDM symbols in the case of extended Cyclic Prefix (CP) (see FIG. 17(*b*)). In a resource block grid, resource elements (REs) indicated by '0', '1', '2' and '3' respectively mean positions of the CRSs of antenna port indexes '0', '1', '2' and '3', and resource elements indicated by 'D' mean positions of the DRS.

The CRS is described in more detail below. The CRS is a reference signal, that is used to estimate a channel of a physical antenna and may be commonly received by all of UEs located within a cell, and is distributed to a whole frequency band. Namely, the CRS is a cell-specific signal and is transmitted every subframe in a wideband. Further, the CRS may be used for channel quality information (CSI) and data demodulation.

The CRS is defined as various formats according to an antenna array at a transmission side (i.e., base station). In the 3GPP LTE system (e.g., Release-8), an RS for a maximum of four antenna ports is transmitted depending on the number of transmission antennas of the base station. A downlink signal transmission side has three types of antenna arrays, such as a single transmission antenna, two transmission antennas, and four transmission antennas. For example, when the number of transmission antennas of the base station is two, the CRSs for antenna ports. '0' and '1' are transmitted. When the number of transmission antennas is four, the CRSs for antenna ports. '0' to '3' are transmitted.

When the base station uses a single transmission antenna, a reference signal for a single antenna port is arranged.

When the base station uses two transmission antennas, reference signals for two transmission antenna ports are arranged using a Time Division Multiplexing (TDM) scheme and/or a Frequency Division Multiplexing (FDM) scheme. Namely, different time resources and/or different frequency resources are allocated to distinguish between reference signals for two antenna ports.

Moreover, when the base station uses four transmission antennas, reference signals for four transmission antenna ports are arranged using the TDM scheme and/or the FDM scheme. Channel information measured by the reception side (i.e., the UE) of a downlink signal may be used to demodulate data transmitted using a transmission scheme, such as transmission of a single transmission antenna, transmission diversity, closed-loop spatial multiplexing, open-loop spatial multiplexing, or a multi-user-multi-input/output antenna (multi-user MIMO).

When a reference signal is transmitted from a specific antenna port in the case where the multi-input/output antenna is supported, the reference signal is transmitted to positions of resource elements specified according to a pattern of the reference signal and is not transmitted to positions of resource elements specified for other antenna ports. Namely, reference signals between different antennas do not overlap each other.

A rule for mapping a CRS to a resource block is defined as follows.

$$k = 6m + (v + v_{shift}) \bmod 6 \qquad \text{[Equation 18]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots , 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 0 \text{ and } l = 0 \\ 0 & \text{if } p = 0 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 18, k and 1 respectively denote a subcarrier index and a symbol index, and p denotes an antenna port. $N_{symb}^{DL}$ denotes the number of OFDM symbols in one downlink slot, and $N_{RB}^{DL}$ denotes the number of radio resources allocated to the downlink. ns denotes a slot index, and $N_{ID}^{cell}$ denotes a cell ID. mod denotes a modulo operation. A position of a reference signal varies depending on a value of $v_{shift}$ in a frequency domain Since $v_{shift}$ depends on the cell ID, the position of the reference signal has various frequency shift values depending on the cell.

More specifically, in order to improve a channel estimation performance through a CRS, a position of the CRS may be shifted in a frequency domain depending on a cell. For example, when reference signals are located at an interval of three subcarriers, reference signals in one cell are allocated to 3k-th subcarriers, and reference signals in another cell are allocated to (3k+1)th subcarriers. In terms of one antenna port, reference signals are arranged at an interval of six resource elements in a frequency domain and are separated from a reference signal allocated to another antenna port at an interval of three resource elements.

In a time domain, reference signals are arranged at a constant interval starting from a symbol index '0' of each slot. A time interval is differently defined depending on the length of a cyclic prefix. In the case of normal cyclic prefix, reference signals are located at symbol indexes '0' and '4' of a slot. In the case of extended cyclic prefix, reference signals are located at symbol indexes '0' and '3' of a slot. A reference signal for an antenna port that has a maximum value among two antenna ports is defined within one OFDM symbol. Thus, in the case of transmission of four transmission antennas, reference signals for reference signal antenna ports '0' and '1' are located at the symbol indexes '0' and '4' of the slot (the symbol indexes '0' and '3' in the case of extended cyclic prefix), and reference signals for antenna ports '2' and '3' are located at the symbol index '1' of the slot. The positions of the reference signals for the antenna ports '2' and '3' in a frequency domain are changed with each other in a second slot.

The DRS is described in more detail below. The DRS is used to demodulate data. In the multi-input/output antenna transmission, a precoding weight used for a specific UE is used without change in order to estimate a channel combined with and corresponding to a transmission channel transmitted from each transmission antenna when the UE has received a reference signal.

The 3GPP LTE system (e.g., Release-8) supports a maximum of four transmission antennas, and a DRS for rank 1 beamforming is defined. The DRS for rank 1 beamforming also indicates a reference signal for an antenna port index '5'.

A rule of mapping the DRS to a resource block is defined as follows. Equation 19 indicates the case of the normal cyclic prefix, and Equation 20 indicates the case of the extended cyclic prefix.

$$k=(k')\bmod N_{sc}^{RB}+N_{sc}^{RB}\cdot n_{PRB} \qquad \text{[Equation 19]}$$

$$k'=\begin{cases}4m'+v_{shift} & \text{if } l\in\{2,3\}\\ 4m'+(2+v_{shift})\bmod 4 & \text{if } l\in\{5,6\}\end{cases}$$

-continued $$l=\begin{cases}3 & l'=0\\ 6 & l'=1\\ 2 & l'=2\\ 5 & l'=3\end{cases}$$

$$l'=\begin{cases}0,1 & \text{if } n_s\bmod 2=0\\ 2,3 & \text{if } n_s\bmod 2=1\end{cases}$$

$$m'=0,1,\ldots,3N_{RB}^{PDSCH}-1$$

$$v_{shift}=N_{ID}^{cell}\bmod 3$$

$$k=(k')\bmod N_{sc}^{RB}+N_{sc}^{RB}\cdot n_{PRB} \qquad \text{[Equation 20]}$$

$$k'=\begin{cases}3m'+v_{shift} & \text{if } l=4\\ 3m'+(2+v_{shift})\bmod 3 & \text{if } l=1\end{cases}$$

$$l=\begin{cases}4 & l'\in\{0,2\}\\ 1 & l'=1\end{cases}$$

$$l'=\begin{cases}0 & \text{if } n_s\bmod 2=0\\ 1,2 & \text{if } n_s\bmod 2=1\end{cases}$$

$$m'=0,1,\ldots,4N_{RB}^{PDSCH}-1$$

$$v_{shift}=N_{ID}^{cell}\bmod 3$$

In Equations 19 and 20, k and 1 respectively denote a subcarrier index and a symbol index, and p denotes an antenna port. $N_{sc}^{RB}$ denotes a size of a resource block in a frequency domain and is expressed as the number of subcarriers. $n_{PRB}$ denotes the number of physical resource blocks. $N_{RB}^{PDSCH}$ denotes a frequency band of a resource block for PDSCH transmission. ns denotes a slot index, and $N_{ID}^{cell}$ denotes a cell ID. mod denotes a modulo operation. A position of a reference signal varies depending on a value of $v_{shift}$ in a frequency domain. Since $v_{shift}$ depends on the cell ID, the position of the reference signal has various frequency shift values depending on the cell.

In an LTE-A system that is an evolved and developed form of an LTE system, a maximum of eight transmission antennas needs to be designed to be supported to the downlink of the base station. Thus, RSs for a maximum of 8 transmission antennas also need to be supported. In the LTE system, since only RSs for a maximum of four antenna ports are defined in a downlink RS, when the base station has four to a maximum of eight downlink transmission antennas in the LTE-A system, RSs for antenna ports need to be additionally defined and designed. The RSs for the maximum of eight transmission antenna ports each need to be designed as both an RS for channel measurement and an RS for data demodulation described above.

One of important considerations in designing the LTE-A system is backward compatibility, that is, that an LTE terminal needs to operate normally even in the LTE-A system with unstudied ease and the system also needs to support the backward compatibility. In terms of the RS transmission, in a time-frequency domain in which the CRS defined in the LTE is transmitted over a whole band every subframe, RSs for a maximum of eight transmission antenna ports have to be additionally defined. In the LTE-A system, when RS patterns for a maximum of eight transmission antennas are added to the whole band every subframe by the same method as a CRS of an existing LTE, RS overhead is excessively increased.

Accordingly, in the LTE-A system, a newly designed RS is roughly classified into two types that include an RS (CSI-RS: Channel State Information-RS, Channel State Indication-RS, etc.) for the purpose of the channel measurement for the selection of MCS, PMI, etc. and an RS (DMRS: Data Demodulation-RS) for the demodulation of data transmitted to eight transmission antennas.

The CSI-RS for the purpose of the channel measurement is characterized in that it is designed for the main purpose of channel measurement, unlike an existing CRS that is used for both the measurement, such as channel measurement and handover, and data demodulation. Of course, the CSI-RS may also be used for the purpose of measurement such as handover. Since the CSI-RS is transmitted only for the purpose of obtaining information on a channel state, the CSI-RS may not be transmitted every subframe unlike the CRS. In order to reduce overhead of the CSI-RS, the CSI-RS is intermittently transmitted on the time axis.

For the data demodulation, the DMRS is dedicatedly transmitted to a UE scheduled in a corresponding time-frequency domain. Namely, a DMRS of a specific UE is transmitted only to a region in which the corresponding UE has been scheduled, i.e., a time-frequency domain in which data is received.

In the LTE-A system, an eNB has to transmit CSI-RSs for all antenna ports. Because transmitting CSI-RSs for a maximum of eight transmission antenna ports every subframe has a disadvantage that the overhead is excessively increased, the CSI-RS is not transmitted every subframe and has to be intermittently transmitted on the time axis, thereby reducing the overhead. Namely, the CSI-RS may be transmitted periodically at an integer multiple period of one subframe or transmitted in a specific transmission pattern. In this case, the period or the pattern in which the CSI-RS is transmitted may be configured by the eNB.

In order to measure the CSI-RS, the UE needs to be aware of information about a transmission subframe index of the CSI-RS, a CSI-RS resource element (RE) time-frequency position within a transmission subframe, and a CSI-RS sequence for each CSI-RS antenna port of a cell to which the UE itself belongs.

In the LTE-A system, the eNB has to transmit the CSI-RS to each of a maximum of eight antenna ports. Resources used for the CSI-RS transmission of different antenna ports have to orthogonal to each other. When one eNB transmits CSI-RSs for different antenna ports, the resources can be orthogonally allocated according to the FDM/TDM scheme by mapping the CSI-RSs for the respective antenna ports to different REs. Alternatively, the CSI-RSs for the different antenna ports may be transmitted according to a CDM scheme for mapping the CSI-RSs to codes orthogonal to each other.

When the eNB notifies a UE belonging to the eNB of information on a CSI-RS, the eNB first has to notify the UE of information about a time-frequency to which a CSI-RS for each antenna port is mapped. More specifically, the information includes subframe numbers to which the CSI-RS is transmitted or a period in which the CSI-RS is transmitted, a subframe offset to which the CSI-RS is transmitted, an OFDM symbol number to which the CSI-RS RE of a specific antenna is transmitted, a frequency spacing, an offset or a shift value of an RE in a frequency axis, and the like.

Figure 18:
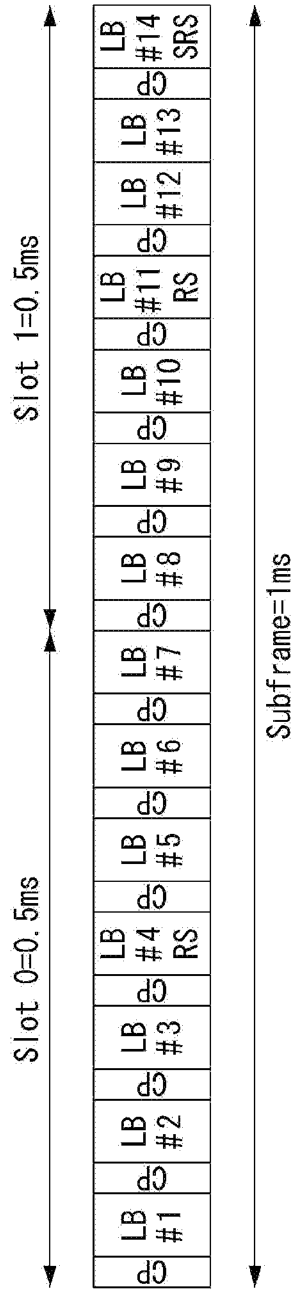
FIG. 18 illustrates an uplink subframe including a sounding reference signal symbol in a wireless communication system to which the present invention is applicable.

FIG. 18 illustrates an uplink subframe including a sounding reference signal symbol in a wireless communication system.

Referring to FIG. 18, an SRS is always transmitted through a last SC-FDMA symbol on an arranged subframe. Thus, the SRS and a DMRS are located at different SC-FDMA symbols.

The PUSCH data transmission is not allowed in a specific SC-FDMA symbol for SRS transmission. As a result, when sounding overhead is the highest, i.e., even if an SRS symbol is included in all subframes, the sounding overhead does not exceed about 7%.

Each SRS symbol is generated by a base sequence (i.e., a random sequence or a sequence set based on Zadoff-Ch (ZC)) regarding a given time unit and frequency band, and all UEs within the same cell use the same base sequence. In this case, the SRS transmissions from a plurality of UEs within the same cell at the same frequency band and the same time are orthogonal to each other by different cyclic shifts of a base sequence and are distinguished from each other.

SRS sequences from different cells may be distinguished from each other by allocating different base sequences to respective cells, but orthogonality between the different base sequences is not ensured.

Hereinafter, an uplink physical layer of narrowband IoT (NB-IoT) is described in more detail.

Uplink

1. Physical Channels

Narrowband physical channels are defined as follows:

Narrowband Physical Uplink Shared Channel, NPUSCH

Narrowband Physical Random Access Channel, NPRACH

2. Physical Signals

Uplink narrowband physical signals are defined as follows:

Narrowband demodulation reference signal

3. Slot Structure and Physical Resources 3.1. Resource Grid

A physical channel or a physical signal transmitted from one slot is represented by one resource grid or several resource grids of $N_{sc}^{UL}$ subcarriers and $N_{symb}^{UL}$ SC-FDMA symbols.

FIG. 19 illustrates an example of an uplink resource grid for NB-IoT to which a method proposed by this specification is applicable.

In terms of subcarriers $N_{sc}^{UL}$, an uplink bandwidth and a slot duration $T_{slot}$ are given by Table 3 below.

Namely, Table 3 indicates an example of NB-IoT parameters.

TABLE 3

| Subcarrier spacing | $N_{sc}^{UL}$ | $T_{slot}$ |
|---|---|---|
| Δf = 3.75 kHz | 48 | $61440 \cdot T_s$ |
| Δf = 15 kHz | 12 | $15360 \cdot T_s$ |

A single antenna port p=0 is used for all of uplink transmissions.

3.2. Resource Elements

Each element in a resource grid is called a resource element and is unique by an index pair (k, l) in one slot.

Here, $k=0, \ldots, N_{sc}^{RB}-1$ and $l=0, \ldots, N_{symb}^{UL}-1$ are an index in a frequency domain and an index in a time domain, respectively.

A resource element (k,l) corresponds to a complex value $a_{k,l}$.

Quantities $a_{k,l}$ corresponding to resource elements that are not used for the transmission of physical channels or physical signals in one slot are set to zero.

3.3. Resource Unit (RU)

Resources units are used to indicate mapping an NPUSCH to a resource element.

The resources unit is defined as consecutive SC-FDMA symbols $N_{symb}^{UL}N_{slots}^{UL}$ in a time domain and consecutive subcarriers $N_{sc}^{RU}$ in a frequency domain.

Here, $N_{sc}^{RU}$ and $N_{symb}^{UL}$ are given by Table 4 below.

Table 4 indicates supported combinations of $N_{sc}^{RU}$, $N_{slots}^{UL}$, and $N_{symb}^{UL}$.

TABLE 4

| Δf | $N_{sc}^{RU}$ | $N_{slots}^{UL}$ | $N_{symb}^{UL}$ |
|---|---|---|---|
| 3.75 kHz | 1 | 16 | 7 |
| 15 kHz | 1 | 16 | |
| | 3 | 8 | |
| | 6 | 4 | |
| | 12 | 2 | |

4. Narrowband Physical Uplink Shared Channel (NPUSCH)

4.1. Modulation

TABLE 5

| Physical channel | $N_{sc}^{RU}$ | Modulation scheme |
|---|---|---|
| NPUSCH | 1 | π/2 BPSK, π/4 QPSK |
| | >1 | QPSK |

4.2. Mapping to Physical Resources

Blocks z(0), . . . , z($M_{symb}^{ap}$−1) of complex-valued symbols are multiplied by an amplitude scaling factor in order to conform to a transmission power $P_{NPUSCH}$ and are mapped to subcarriers assigned for NPUSCH transmission in sequence starting from z(0).

Mapping to the resource element (k,l) corresponding to subcarriers, which have been assigned for the transmission but are not used for the transmission of reference signals, is performed first in increasing order of the k index starting from a first slot of the assigned resource unit and then performed in increasing order of the 1 index.

The NPUSCH may be mapped to one or more resource units.

As mentioned above, NB-IoT (or NB-LTE) is a system for supporting UEs with low cost and low complexity constraints using narrowband.

Further, the NB-IoT considers a situation, in which multiple UEs access via limited communication resources, and aims to support wider coverage than coverage of the legacy LTE.

A typical characteristic of the NB-IoT is that single subcarrier transmission is considered in an uplink situation.

The single subcarrier transmission is called or expressed as single tone transmission.

When the single subcarrier transmission is used, problems in various aspects including a lack of subcarrier resource, a support for extreme coverage, etc. can be solved.

Further, the single tone (or subcarrier) transmission supports π/2-BPSK modulation and π/4-QPSK modulation.

Accordingly, this specification provides a method for designing (or generating) an uplink DMRS sequence for supporting single tone transmission of NB-IoT.

Here, a DMRS sequence means a reference signal sequence used for a DMRS and hereinafter is referred to as "DMRS sequence" for convenience of explanation.

The contents and methods proposed by this specification have been described limiting to the single tone transmission of NB-IoT for convenience of explanation, but may be applied to transmissions of uplink data channel, downlink data channel, uplink control channel, and downlink control channel of all systems using the single tone transmission.

Further, the contents and methods proposed by this specification may be applied to transmission using multiple subcarriers.

The number of multiple subcarriers may be 2, 3, 6, or 12, etc.

Hereinafter, a method of generating a DMRS sequence in an NB-IoT system proposed by this specification is described.

More specifically, the method of generating the DMRS sequence in the NB-IoT system may be roughly classified into (1) a method of generating a DMRS sequence for single tone transmission (2) a method of generating a DMRS sequence for multi-tone transmission.

In this specification, a DMRS in the NB-IoT system may be expressed as a narrowband DMRS.

DMRS Sequence for Single Tone Transmission

A method of generating a DMRS sequence for single tone transmission is first described.

In uplink single tone transmission, a frequency resource usable as a frequency domain is limited to one.

The uplink single tone transmission means performing uplink transmission through a single tone.

Thus, considering a single tone transmission situation in terms of DMRS, a structure or a design rule of an existing DMRS sequence (supporting in the LTE system) cannot be used for the single tone transmission.

Because the existing DMRS sequence supports sequence mapping to a frequency domain.

Thus, in the case of single tone transmission, the DMRS sequence has to use a DMRS sequence mapping rule to a time domain instead of a DMRS sequence mapping rule to the frequency domain.

As described above, a reason why the DMRS sequence mapping to the time domain is performed may be considered as the following two reasons.

First, the DMRS sequence mapping to the time domain may be used as a purpose for reducing a DMRS interference between contiguous cells.

Second, the DMRS sequence mapping to the time domain may be used as a purpose for obtaining a spreading effect increasing channel estimation accuracy by combining several DMRS symbols spreading in the time domain.

Considering the above two purposes, the DMRS sequence mapping to the time domain may be considered to be suitable for the design of the uplink transmission supporting the single tone transmission.

Hereinafter, the contents related to a length of the DMRS sequence, the generation of the DMRS sequence, etc. are described in more detail.

A length of the DMRS sequence considering a method for mapping the DMRS sequence to the time domain may be determined by time unit(s) a system has.

The time unit may be represented by a specific time unit.

Namely, the length of the DMRS sequence may be determined considering various factors including a length of an uplink resource unit, an influence of a frequency offset error, a coherence time of a channel, etc.

For example, when the length of the DMRS sequence is determined based on a resource unit in the single tone transmission of NB-IoT, the following three methods (including (Method 1) to (Method 3)) may be considered.

(Method 1) It is assumed that L slot(s) are included in one resource unit, and each slot includes M DMRS symbol(s). Here, L is a natural number.

In this case, when one DMRS sequence is applied to all the L slot(s), a total of L*M DMRS symbol(s) are used, and a length of the DMRS sequence is defined as L*M.

(Method 2) L slot(s) are divided into two or more sections, and the number of DMRS symbols included in each section is used as a length of the DMRS sequence.

When the L slot(s) are divided into N sections of the same number, each section has UN slots and has a total of L*M/N DMRS symbol(s).

Thus, the length of the DMRS sequence is L*M/N.

(Method 3) In order to perform the mapping of the DMRS sequence in units larger than L slot(s), a method for generating a DMRS sequence of a size larger than L*M and then dividedly using the generated DMRS sequence may be considered.

As discussed above, the DMRS sequence means a reference signal sequence used in a DMRS.

For example, a method for distributing a DMRS sequence of L*M length to each resource unit and mapping the DMRS sequence after defining K resource units as one unit and generating a DMRS sequence of a total of K*L*M length may be considered.

The above Methods 1 to 3 have been described using the slot unit as an example for convenience of explanation, but are not limited thereto. The corresponding contents may be applied using 'unit' of various time units such as the subframe, the radio frame, or the plurality of slots.

As discussed above, various methods for determining the length of the DMRS sequence may be used fixed to one and may select one of the plurality of methods.

In this case, a criterion for determining the length of the DMRS sequence may use a method for maximizing channel estimation accuracy in consideration of symbol combination.

Further, the DMRS sequence may be generated using a PN-sequence, a gold sequence, an RM-code, and the like.

When one UE supports a plurality of transmission modes, different DMRS sequences may be applied to the respective transmission modes, or a method for generating the same DMRS sequence regardless of the transmission modes may be used.

Next, an example of a method for generating a DMRS sequence using a PN-sequence (or based on the PN-sequence) is described.

A length of the PN-sequence may be determined by the above-described Methods 1 to 3.

In this case, a length of a DMRS sequence necessary for the DMRS transmission and a length of a possible PN-sequence may not match each other.

If the length of the PN-sequence is shorter than the length of the DMRS sequence, the DMRS sequence may be generated by (consecutively) repeatedly deploying the same PN-sequence using periodicity of the PN-sequence and cutting the repeatedly deployed PN-sequence by a length required for the DMRS transmission.

FIG. 20 illustrates an example of a method for generating a DMRS sequence proposed by this specification.

A length of a PN-sequence, in which the number (m) of shift registers is 3 (m=3), is 7(23-1).

If a length of a required DMRS sequence is 8, the DMRS sequence may be used by consecutively deploying the two PN-sequences of length 7 and then cutting the deployed PN-sequence by length 8.

This is the same as copying and pasting a first element of the PN-sequence to an end of the PN-sequence.

FIG. 21 illustrates another example of a method for generating a DMRS sequence proposed by this specification.

FIG. 21 illustrates a method for using a DMRS sequence by generating a PN-sequence longer than the DMRS sequence and cutting the generated PN-sequence by a required length.

For example, a length of the PN-sequence, in which the number (m) of shift registers is 4 (m=4), is 15(24-1).

If a length of a required DMRS sequence is 8, the DMRS sequence may be used by cutting a sequence of length 8 from a proper section of the PN-sequence of length 15.

The matching method of the sequence length illustrated in FIGS. 20 and 21 has been described using the PN-sequence as an example, but is not limited thereto. Even if other sequences such as a gold-sequence and an RM-code-based sequence are used, the same method may be applied.

Next, a method for distinguishing a PN-sequence or a DMRS sequence is described.

Because UEs within the same cell have the same cell ID, they have the same initial state.

Thus, the UEs may use the same PN-sequence.

Here, the initial state may be determined based on the cell ID and may be a value indicating a starting point of the PN-sequence.

Here, the base station enables corresponding UEs to use different DMRS sequences by providing different transmission timings to the UEs within the same cell.

Here, the transmission timing may indicate a start time of the DMRS sequence.

Because UEs within different cells have different cell IDs, they have different initial states.

Thus, corresponding UEs may use DMRS sequences having different initial states.

Here, the DMRS sequences having the different initial states may be generated from PN-sequences having different initial states.

Namely, in order to distinguish the PN-sequences used for the respective cells, the PN-sequence for each cell may be defined to use a different initial state.

Here, the initial state of the PN-sequence may indicate a point or a position at which the PN-sequence starts.

Hence, correlation property between the PN-sequences, each of which is generated in each cell, is reduced due to different initial state values of the PN-sequences, and as a result cross correlation property can be reduced.

In order to ensure correlation property between the DMRS sequences each of which is generated in each cell, a time at which a different initial state allocated to each cell is applied needs to be the same in all the cells.

Namely, the synchronization of initial timing for a time at which the initial state is applied to each cell needs to be performed.

Accordingly, each UE may be informed of initial timing, at which an initial state is determined based on a cell ID, by signaling information of the cell (or the base station).

After the initial timing, each state used in a PN-sequence generator proceeds in the same manner as a time unit has passed.

For example, if M DMRS symbol(s) are included in one slot, the initial state proceeds to a step subsequent to a step M each time one slot has passed.

FIG. 22 illustrates another example of a method for generating a DMRS sequence proposed by this specification.

Referring to FIG. 22, a DMRS sequence may be generated by (1) determining an initial state based on a cell ID, (2) generating a PN-sequence having the determined initial state through a PN-sequence generator, and (3) applying a transmission timing to the generated PN-sequence.

Here, the transmission timing may indicate a time or a position, at which the DMRS sequence starts, and may be represented as units of subframe, frame, slot, or symbol, etc.

FIG. 23 illustrates another example of a method for generating a DMRS sequence proposed by this specification.

In case of a partial (or specific) DMRS transmission, the number of DMRS symbols required for the transmission may be more than a fixed length of a DMRS sequence.

In this case, several DMRS sequences may be consecutively deployed.

However, even in this case, a method is needed to generate a DMRS sequence considering correlation property between DMRS sequences generated in respective cells.

One method to do this is to generate (or create, produce, make) a DMRS sequence subsequent to a previous DMRS sequence.

Namely, in the deployment of consecutive DMRS sequences, an m-th DMRS sequence is generated (or created) subsequent to an (m−1)th DMRS sequence.

An example of an operation of generating or creating such a DMRS sequence may be as follows.

(1) A new transmission timing is applied every time the number of times the DMRS sequence is generated. In this case, the transmission timing indicates a time or a position at which a new DMRS sequence starts.

(2) An initial state of a DMRS sequence is regarded as each element unit of a DMRS sequence and may be determined as a function of a cell ID, a transmission timing at which an initial transmission starts, and/or an SFN.

Here, the SFN is information required to calculate the number of DMRS symbols which proceed, and may be replaced by the number of slots, the number of subframes, or the number of resource units, etc.

As shown in FIG. 23, a second DMRS sequence of length 8 may be generated subsequent to a first DMRS sequence of length 8.

Further, a start time of the first DMRS sequence may be determined based on the transmission timing.

In addition, each of the DMRS sequences may be generated by repeating a PN-sequence having an initial state determined based on a cell ID.

Figure 24:
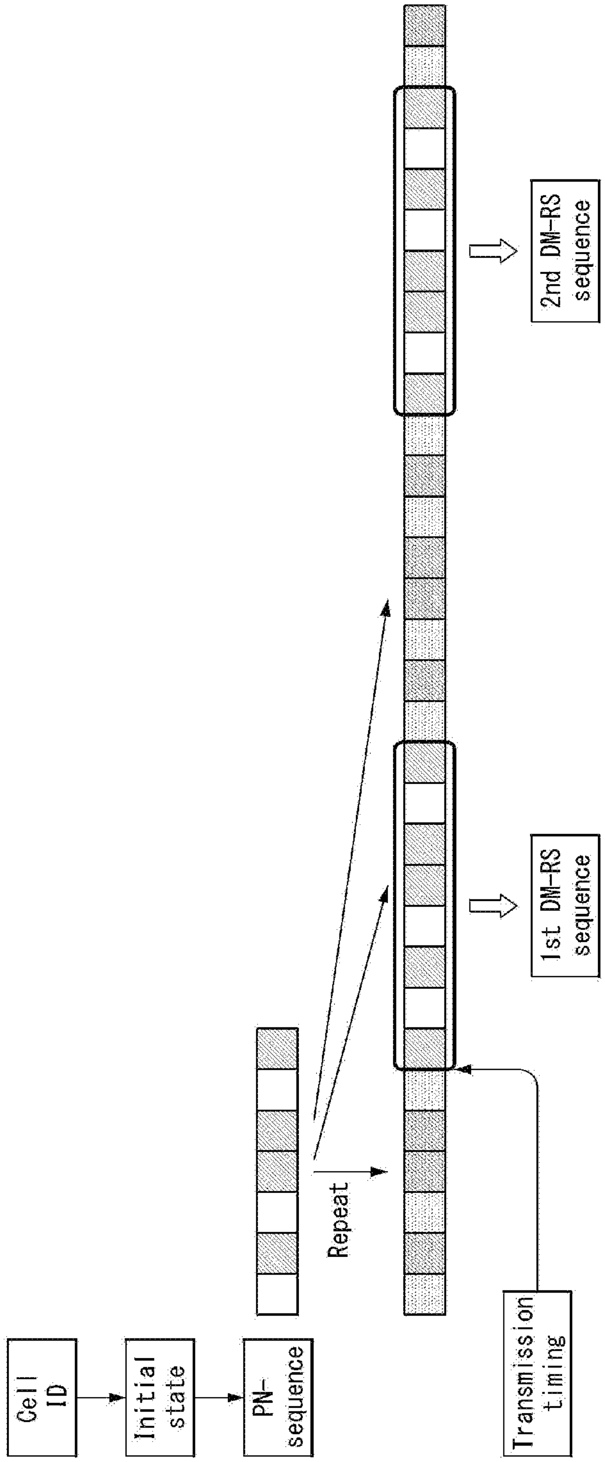
FIG. 24 illustrates another example of a method for generating a DMRS sequence proposed by this specification.

FIG. 24 illustrates another example of a method for generating a DMRS sequence proposed by this specification.

In the case of uplink transmission in NB-IoT, a UE may have to pause the uplink transmission due to several causes (e.g., existence of a guard period, etc.) and then perform the transmission again.

For example, if the UE needs to transmit L slots, the transmission stops during J slots after K slots are transmitted, and then remaining L-K slots can be transmitted.

However, even in this case, a DMRS generation rule for satisfying the correlation property of DMRS sequences between the respective cells needs to be configured.

Accordingly, if the UL transmission stops, a rule for generating the DMRS sequence may be defined as follows.

(1) There is a method for defining again a transmission timing of the DMRS sequence each time a new transmission starts.

This may be interpreted that the DMRS sequence is initialized for each new transmission.

In other words, the method defines a transmission timing at a time at which an initial transmission starts, calculates a time unit corresponding to a transmission interruption interval, and defines again a transmission timing at a time at which the transmission restarts based on the calculated time unit.

Here, a newly defined transmission timing may be defined as a function of an initial transmission timing and a time unit performed while the transmission is idle (or interrupted).

(2) The SFN is included in a function for determining an initial state of DMRS sequence generation.

Here, the initial state may be information indicating a time at which the DMRS sequence generation starts.

In this case, the initial state generating the DMRS sequence may be determined as a function of the cell ID, the transmission timing, and/or the SFN.

The SFN may be replaced by a specific number of time units, for example, the number of slots, the number of subframes, or the number of frames that has passed since the start of transmission.

In this case, the number of time units corresponding to a transmission interruption interval is continuously counted, and an initial state of a time at which the transmission restarts has to be calculated to reflect the cumulative number of time units, including the number of time units corresponding to the transmission interruption interval.

Referring to FIG. 24, a second DMRS sequence may be generated after a first DMRS sequence is generated and a predetermined number of time unit(s) has passed.

Further, an initial sate for each of the first and second DMRS sequences may be determined by the application of the transmission timing or the SFN.

The above-described method for generating the DMRS sequence may be regarded as being the same as a method for generating a PN-sequence of which an initial state is determined by a cell ID, a transmission timing and/or an SFN (or time unit that has passed while the transmission stops).

In this specification, it may be interpreted that the expression of “A and/or B” has the same sense as “including at least one of A or B”.

Accordingly, the DMRS sequence generation may simply use a method for determining an initial state of a PN-sequence generator by a function of a cell ID, a transmission timing and/or an SFN (or time unit that has passed while the transmission stops).

Further, an output sequence length of the PN-sequence generator is determined by a length of the DMRS sequence.

With reference to FIGS. 25 and 26, the method for generating the DMRS sequence described above is summarized as follows.

FIG. 25 illustrates another example of a method for generating a DMRS sequence proposed by this specification, and FIG. 26 illustrates an example of an initial state of a DMRS sequence proposed by this specification.

FIGS. 25 and 26 illustrate a method for generating a DMRS sequence by determining an initial state based on a cell ID, a transmission timing and/or an SFN (or time unit that has passed while the transmission stops) and using the determined initial state and a PN-sequence generator.

Referring to FIG. 25, an initial state indicating a start time of DMRS sequence generation may be determined using the cell ID, the transmission timing and/or the SFN.

The DMRS sequence is generated based on the determined initial state and the PN-sequence generator, and the generated DMRS sequence may be modulated and then mapped to a resource element.

Here, the method for generating the DMRS sequence based on a PN-sequence may be defined as Equation 21 below.

$$c(n)=x(n+N_c)$$

$$x(n+1)=(x(n+p_1)+x(n+p_2))\bmod 2 \quad \text{[Equation 21]}$$

In Equation 21, x(n+1) denotes an m-sequence or the PN-sequence, and c(n) denotes a specific binary sequence and is used in the DMRS sequence generation.

In Equation 21, 1 is given as the same value as a length of the PN-sequence, on which it is based, and may be determined according to the requirements of a system.

Further, p1 and p2 are values determined by a shift register and may be determined depending on the length of the PN-sequence on which it is based.

The following Table 6 indicates an example of the values of p1 and p2 depending on the length of the PN-sequence.

TABLE 6

| PN-sequence length (1) | Initialized x(n) value | $P_1$ | $P_2$ |
|---|---|---|---|
| 3 | x(0) = 1, x(n) = 0, n = 1 | 1 | 0 |
| 7 | x(0) = 1, x(n) = 0, n = 1, 2 | 2 | {1, 0} |
| 15 | x(0) = 1, x(n) = 0, n = 1, . . . , 3 | 3 | {2, 1, 0} |
| 31 | x(0) = 1, x(n) = 0, n = 1, . . . , 4 | 4 | {3, 2, 1, 0} |
| 63 | x(0) = 1, x(n) = 0, n = 1, . . . , 5 | 5 | {4, 3, 2, 1, 0} |

The p2 value may be determined by selecting one of values in parentheses.

$N_c$ is a value capable of determining the initial state of the generated DMRS sequence and may be determined by a time unit such as the cell ID, the transmission timing and/or the SFN.

In addition, for $N_c$, a certain constant may be always added as a default value.

$N_c$ may be defined as Equation 22 below.

$$N_c=N_b+f(C_{ID},t,s) \quad \text{[Equation 22]}$$

In Equation 22, $N_b$ denotes a constant that is added as a default value, $C_{ID}$ denotes a cell ID, t denotes a transmission timing, and s denotes a time unit such as an SFN.

Alternatively, $N_c$ always has a default value, and n value may be represented as a value determined by the time unit such as the cell ID, the transmission timing and/or the SFN.

In this specification, it may be interpreted that the expression of "cell ID and transmission timing and/or SFN" indicates "cell ID and transmission timing", "cell ID and SFN", and "cell ID, transmission timing, and SFN".

In this case, $N_c$ is fixed to $N_b$ ($N_c=N_b$), and the generation form of the DMRS sequence is the same as the above Equation 22 although there is a difference in mathematical expression.

Separate from the length of the PN-sequence, the length of the DMRS sequence may be determined according to the requirements of the system.

For example, it is assumed that a system is designed to have a PN-sequence generator generating a PN-sequence of length 7.

If a DMRS sequence of length 8 is needed, the DMRS sequence may be generated by substituting n=0 to 7 for c(n).

In the same manner, if a DMRS sequence of length 16 is generated using a PN-sequence generator of length 7, the DMRS sequence may be generated by substituting n=0 to 15 for c(n).

On the contrary, even if the PN-sequence generator is designed to be longer than a length of the DMRS sequence, the above-described method may be applied.

For example, if a PN-sequence generator of length 15 is used, a DMRS sequence of length 8 may be generated by substituting n=0 to 7 for c(n).

Figure 27:
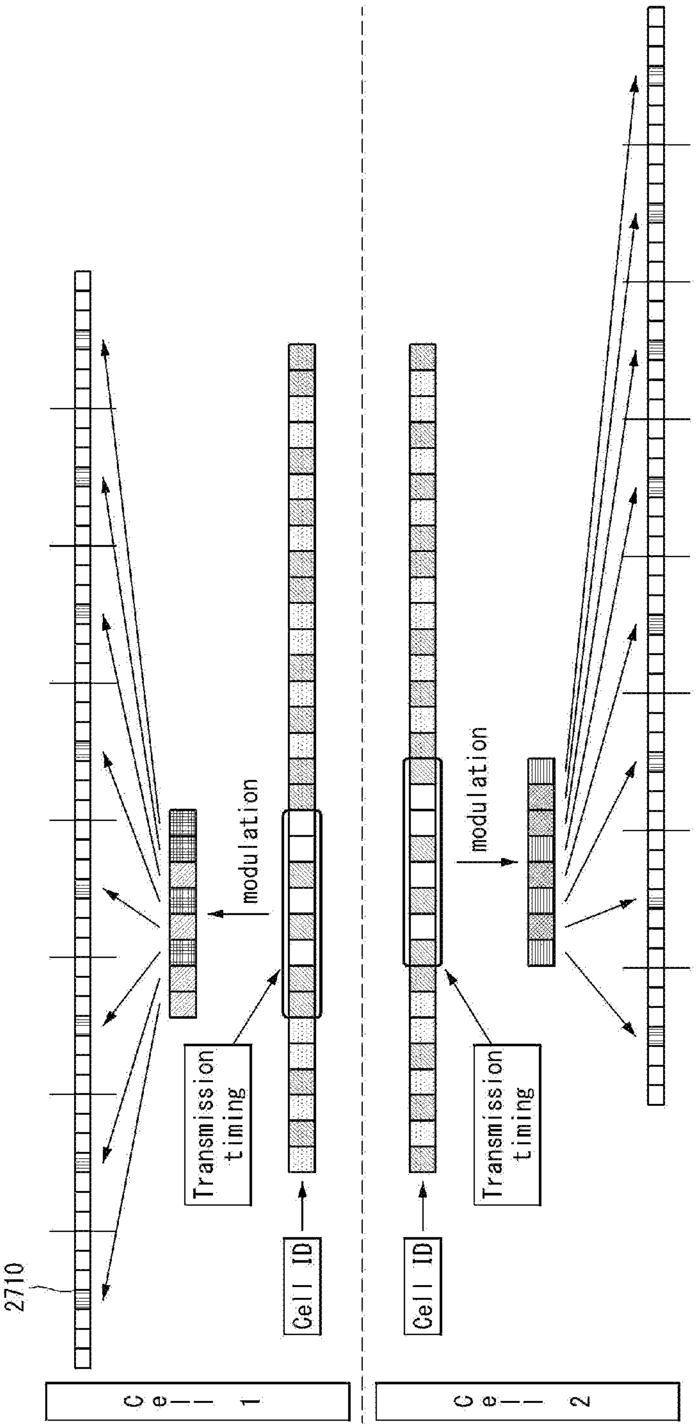
FIG. 27 illustrates an example of a method for mapping a resource element of a DMRS sequence proposed by this specification.

FIG. 27 illustrates an example of a method for mapping a resource element of a DMRS sequence proposed by this specification.

Namely, a DMRS sequence generated by the above method may be modulated according to a transmission mode to be transmitted and may be mapped to each DMRS position.

Here, a position of the DMRS may be a fourth symbol 2710 for each slot.

More specifically, FIG. 27 illustrates a process for generating the DMRS sequence for each cell and mapping the generated DMRS sequence to a DMRS symbol position 2710.

Here, a position and a density of the DMRS symbol position may vary according to the requirements of the system.

Hereinafter, another method for generating the DMRS sequence is described.

The DMRS sequence may be generated by a combination of Hadamard sequence and a gold sequence or a combination of a cyclic code and a gold sequence.

A DMRS sequence pattern for single tone NB-PUSCH transmission may be the same as the following two methods.

Method 1 is to generate a DMRS sequence pattern by an element-wise product of a Hadamard sequence and a PN (or gold)-sequence.

Method 2 is to generate is to generate a DMRS sequence pattern by an element-wise product of by a cyclic code and a PN (or gold)-sequence.

The Method 1 can provide orthogonal property in a synchronous case, and the Method 2 can provide more sequences than the Method 1.

Namely, there is a trade-off between the Method 1 and the Method 2.

Thus, a suitable number of DMRS sequences for single tone NB-IoT transmission needs to be previously determined.

The DMRS sequences have to provide low cross correlation property to minimize an impact of inter-cell interference.

However, a cross correlation value may be affected by the selection of the gold sequence.

To minimize an impact of the cross correlation on the DMRS, a gold sequence based on sequences (1, −1, 1, 1, 1, −1, −1, 1, −1, 1, −1, −1, 1, 1, −1, −1) may be used in the Method 1.

Likewise the Method 1, the Method 2 may use a gold sequence of (1, −1, 1, 1, −1, −1, 1, −1, −1, 1, 1, −1, −1, 1, −1, 1) to minimize an impact of the cross correlation on the DMRS.

As described in pseudo-random sequence generation of 3GPP TS 36.211, a gold sequence required for the single tone transmission may be generated by setting a proper c_init(cint) value of a 2nd m-sequence in a generation method of the gold sequence.

Here, $c_{init}=\Sigma_{i=0}^{30}x_2(i)\cdot 2^i$, and i has an integer value starting from zero.

In this case, a criterion for selecting the c_init value may be determined as a value that makes the cross correlation property the lowest.

For example, when the c_init value is set to 35, 39, 43, 45, 50, 60, 63, etc., the DMRS sequence can have a lowest cross correlation value in all cases, that is, if the DMRS sequences have different modulations or the same modulation.

Here, when the c_init value is 35, the DMRS sequence may have a lowest cross correlation value.

An equation related to the above Pseudo-random sequence generation may be the same as Equation 23 below.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 23]}$$

Here, Nc is 1600, and a first m-sequence (x1(n)) is initialized with x1(0)=1 and x1(n)=0, where n is 1, 2, . . . , 30.

The initialization of the second m-sequence is denoted by $c_{init}=\Sigma_{i=0}^{30}x_2(i)\cdot 2^i$ with a value depending on the application of the sequence.

Here, when the cint value of the second m-sequence used in the generation of the gold sequence is 35, a cross correlation value of the specific sequence may be a lowest value.

In order words, it may be interpreted that the DMRS sequence is generated using the second m-sequence having cint=35.

Here, the cint is a value indicating initialization of c(n), and the c(n) indicates the gold sequence.

Further, because the initialization of the second m-sequence is determined by the cint value and the DMRS sequence is generated based on the second m-sequence, it may be interpreted that the DMRS sequence is initialized to cint=35.

DMRS Sequence for Multi-Tone Transmission

Next, the contents related to the DMRS sequence generation for the multi-tone transmission of NB-IoT is described.

The multi-tone transmission in the NB-IoT system uses 3, 6, or 12 tone transmission.

A DMRS sequence may be based on QPSK symbols in a frequency domain.

In order to design a base sequence having the QPSK symbols, a computer generated sequence (CGS) may be used.

Likewise the LTE system, DMRSs for the multi-tone transmission in the NB-IoT system needs to have several desired characteristics as follows.

Good auto-correlation and low cross correlation properties

Low PAPR/CM (Cubic Metric) in a time domain 64 ($=4^3$) possible base sequences are present in the 3-tone transmission, and 4096 ($=4^6$) possible base sequences are present in the 6-tone transmission.

However, some of the sequences have a high Peak to Average Power Ratio (PAPR) and/or cross correlation properties.

There are few possible combinations for desired characteristics.

For each case with a low PAPR/Cubic Metric (CM) value, some candidate QPSK sequences may be selected.

There is a trade-off between the number of candidates of QPSK sequences and maximum PAPR/CM values.

Among the selected sequences based on the PAPR/CM values, tables for DMRS sequences in terms of correlation properties can be constructed.

Further, there is a trade-off between the number of DMRS sequences and the cross correlation property.

Namely, the less number of DMRS sequences are needed to obtain lower cross correlation property.

Table 7 indicates a DMRS sequence table for 3-tone transmission based on the CM, the PAPR, and the cross correlation property.

Table 7 lists eight available DMRS sequences, whose maximum CM, PAPR, and cross correlation values are 2.45, 4.59, and 0.853, respectively.

Sequences corresponding to indexes (u) 0 to 3 are low CM sequences, and sequences corresponding to indexes (u) 4 to 7 are high CM sequences.

TABLE 7

| u | φ(0) | φ(1) | φ(2) |
|---|---|---|---|
| 0 | 1 | 1 | −3 |
| 1 | 1 | −3 | −3 |
| 2 | 1 | 3 | 1 |
| 3 | 1 | −1 | 1 |
| 4 | 1 | 1 | 3 |
| 5 | 1 | 3 | 3 |
| 6 | 1 | −1 | −1 |
| 7 | 1 | 1 | −1 |

The 6-tone transmission needs to consider desired characteristics of the DMRS sequence likewise the 3-tone transmission.

Two examples of DMRS sequence sets are illustrated in Tables 8 to 12 based on characteristics of the CM, the PAPR, and a cross correlation impact.

Table 8 lists eight DMRS sequences with maximum CM, PAPR, and cross correlation values of 1.71, 5.72, and 0.58, respectively.

Table 9 lists 16 DMRS sequences with maximum CM, PAPR, and cross correlation values of 1.71, 7.57, and 0.69, respectively.

Likewise, there is a trade-off between the number of base sequences and the cross correlation values.

TABLE 8

| u | φ(0) | φ(1) | φ(2) | φ(3) | φ(4) | φ(5) |
|---|---|---|---|---|---|---|
| 0 | 1 | 3 | −3 | −3 | −3 | 3 |
| 1 | 3 | −1 | −1 | −3 | −1 | −1 |
| 2 | 1 | 1 | 1 | 3 | −3 | 1 |
| 3 | −3 | −3 | 3 | −3 | 3 | −1 |
| 4 | 1 | 3 | 1 | 1 | −3 | 3 |
| 5 | −1 | −1 | −3 | 3 | 3 | −3 |
| 6 | −1 | −3 | 1 | 3 | 3 | 1 |
| 7 | 3 | −3 | −3 | 3 | 1 | 3 |

TABLE 9

| u | φ(0) | φ(1) | φ(2) | φ(3) | φ(4) | φ(5) |
|---|---|---|---|---|---|---|
| 0 | −3 | 1 | 1 | 3 | 1 | 1 |
| 1 | 1 | 3 | −3 | 3 | 1 | 3 |
| 2 | 1 | −1 | 3 | −3 | −3 | −3 |
| 3 | 3 | −3 | 3 | −1 | −1 | −3 |
| 4 | −3 | −3 | 3 | −1 | −1 | 1 |
| 5 | 1 | 1 | 1 | 1 | −3 | 1 |
| 6 | −3 | 3 | −3 | −3 | −3 | 1 |
| 7 | −3 | 3 | −3 | 3 | −1 | −1 |
| 8 | −3 | 1 | −3 | −3 | 3 | 3 |

TABLE 9-continued

| u | φ(0) | φ(1) | φ(2) | φ(3) | φ(4) | φ(5) |
|---|---|---|---|---|---|---|
| 9 | 1 | −3 | −3 | −3 | −1 | −3 |
| 10 | 3 | −1 | −3 | −3 | −1 | 1 |
| 11 | 3 | 3 | −1 | −3 | −1 | 3 |
| 12 | 1 | 3 | −3 | 3 | 3 | 1 |
| 13 | −1 | −3 | −1 | 3 | −3 | −3 |
| 14 | 3 | 3 | 1 | 3 | −1 | −3 |
| 15 | 1 | 1 | 3 | −3 | 3 | 1 |

TABLE 10

| u | φ(0) | φ(1) | φ(2) | φ(3) | φ(4) | φ(5) |
|---|---|---|---|---|---|---|
| 0 | −3 | 1 | 1 | −3 | 3 | 3 |
| 1 | −3 | 3 | −3 | 1 | −1 | 3 |
| 2 | 1 | −1 | −3 | −1 | 3 | 1 |
| 3 | −3 | −3 | 3 | −3 | −3 | −1 |
| 4 | 1 | −1 | −1 | 3 | −3 | −3 |
| 5 | 1 | 1 | −3 | 3 | −1 | −1 |
| 6 | −3 | −3 | −3 | −3 | 3 | −1 |
| 7 | 3 | −1 | 3 | −3 | 3 | 3 |
| 8 | 1 | 1 | 1 | −1 | 3 | 1 |
| 9 | 3 | 3 | −1 | 1 | −1 | −3 |
| 10 | −3 | 3 | −3 | −1 | −3 | 3 |
| 11 | 3 | 3 | −3 | −1 | 1 | −1 |
| 12 | −1 | −1 | 3 | −1 | 3 | −1 |
| 13 | −3 | −1 | 3 | −1 | −3 | −1 |
| 14 | 1 | −1 | −1 | −1 | 3 | 3 |
| 15 | 3 | 1 | 3 | −3 | −3 | −3 |

TABLE 11

| u | φ(0) | φ(1) | φ(2) | φ(3) | φ(4) | φ(5) |
|---|---|---|---|---|---|---|
| 0 | −3 | −1 | 1 | −1 | −1 | −3 |
| 1 | −1 | 3 | −1 | 3 | 3 | −3 |
| 2 | 1 | −1 | −3 | −1 | −1 | 1 |
| 3 | −3 | −1 | −3 | −3 | 1 | −3 |
| 4 | 1 | −3 | −3 | 3 | −3 | −1 |
| 5 | 1 | 1 | −3 | −1 | −1 | −1 |
| 6 | −3 | 3 | −3 | −3 | −1 | 1 |
| 7 | −3 | 1 | 1 | 3 | −1 | 3 |
| 8 | −1 | −3 | 1 | 3 | 3 | −1 |
| 9 | 1 | 1 | −1 | 3 | −1 | −1 |
| 10 | −3 | 1 | −1 | −1 | −1 | 3 |
| 11 | −3 | 1 | −1 | −1 | 1 | −1 |
| 12 | −1 | −1 | 3 | 3 | −3 | 3 |
| 13 | −3 | 3 | −3 | 1 | 3 | −3 |
| 14 | 3 | 3 | −1 | −1 | −3 | −1 |
| 15 | 1 | −3 | 1 | 3 | 1 | −1 |

TABLE 12

| u | φ(0) | φ(1) | φ(2) | φ(3) | φ(4) | φ(5) |
|---|---|---|---|---|---|---|
| 0 | 3 | −3 | 3 | −1 | 3 | 3 |
| 1 | 3 | −1 | −1 | −1 | 1 | −1 |
| 2 | 3 | 3 | −3 | −3 | 1 | −3 |
| 3 | 1 | −1 | 1 | −3 | −3 | 1 |
| 4 | −3 | −1 | 3 | 1 | −3 | −3 |
| 5 | −3 | 3 | 1 | 3 | −3 | 1 |
| 6 | −1 | 1 | −1 | −3 | 3 | −3 |
| 7 | 3 | −3 | −1 | 3 | 1 | −1 |
| 8 | −3 | −1 | 1 | 1 | −1 | −3 |
| 9 | −1 | 3 | −1 | −1 | −1 | −3 |
| 10 | 3 | −1 | −1 | 1 | 1 | −1 |
| 11 | −1 | 3 | −1 | −1 | 3 | 3 |
| 12 | 3 | −1 | −1 | −3 | −1 | −1 |
| 13 | −3 | 3 | −3 | 3 | −1 | −1 |
| 14 | 3 | 3 | −3 | 3 | 3 | −1 |
| 15 | 1 | −1 | −1 | −1 | 3 | −1 |

Alternatively, a method of selecting a good CM value based on a sequence table constructed considering only the cross correlation value may be considered.

For example, when 16 DMRS base sequences are selected based on the best cross correlation value, the CM value greatly increases, which may cause a problem in the UE.

In this case, a table for a new DMRS base sequence may be constructed by excluding the high CM values from the constructed table.

Table 13 indicates CM result values for 16 indexes, and FIG. 28 illustrates result values of Table 13 by a graph.

Namely, FIG. 28 illustrates CM result values for the DMRS base sequences.

In FIG. 28, a horizontal axis represents the index, and a vertical axis represents the CM result value.

Referring to Table 13, it can be seen that CM result values for an index 1 and an index 11 are the highest.

Table 14 indicates cross correlation values for 16 indexes.

Referring to Table 14, it can be seen that cross correlation values for all the indexes have similar values.

Namely, it can be seen that cross correlation values of an index 1 and an index 11 are similar to cross correlation values of other indexes.

Accordingly, even if the index 1 and the index 11 are excluded from a DMRS sequence set, a performance of cross correlation for the DMRS sequence is not deteriorated.

Accordingly, it is preferable that the DMRS sequence set for the 6-tone transmission is configured except the index 1 and the index 11 which have the cross correlation value similar to other indexes and have the highest CM value among the 16 indexes.

Table 15 indicates 16 DMRS sequence sets for 6-tone transmission with best cross correlation, and Table 16 is a table excluding two indexes (an index 1 and an index 11) with the highest CM value from 16 DMRS sequence sets for 6-tone transmission with best cross correlation.

Here, sequences excluded from the 16 DMRS sequence sets may be selected in various numbers according to the requirements of the CM value and may be selected differently from the high CM value.

TABLE 13

| Index | CM |
|---|---|
| 0 | 3.2136408 |
| 1 | 4.9714402 |
| 2 | 2.5421862 |
| 3 | 1.1932239 |
| 4 | 1.1932239 |
| 5 | 0.9611796 |
| 6 | 1.0213762 |
| 7 | 3.1424979 |
| 8 | 1.9028397 |
| 9 | 2.5421862 |
| 10 | 3.2136408 |
| 11 | 4.9714402 |
| 12 | 0.9611796 |
| 13 | 3.1424979 |
| 14 | 1.9028397 |
| 15 | 1.0213762 |

TABLE 14

| Index | 0 | 1 | 2 | 3 | 4 | 5 | 6 | 7 |
|---|---|---|---|---|---|---|---|---|
| 0 | 1 | 0.745356 | 0.537317 | 0.745356 | 0.630518 | 0.584576 | 0.735472 | 0.630518 |
| 1 | 0.745356 | 1 | 0.735472 | 0.584576 | 0.611456 | 0.745356 | 0.537317 | 0.745356 |
| 2 | 0.537317 | 0.735472 | 1 | 0.743481 | 0.745356 | 0.537317 | 0.745356 | 0.611456 |
| 3 | 0.745356 | 0.584576 | 0.743481 | 1 | 0.745356 | 0.745356 | 0.537317 | 0.611456 |
| 4 | 0.630518 | 0.611456 | 0.745356 | 0.745356 | 1 | 0.745356 | 0.630518 | 0.735472 |
| 5 | 0.584576 | 0.745356 | 0.537317 | 0.745356 | 0.745356 | 1 | 0.743481 | 0.745356 |
| 6 | 0.735472 | 0.537317 | 0.745356 | 0.537317 | 0.630518 | 0.743481 | 1 | 0.630518 |
| 7 | 0.630518 | 0.745356 | 0.611456 | 0.611456 | 0.735472 | 0.745356 | 0.630518 | 1 |
| 8 | 0.743481 | 0.537317 | 0.745356 | 0.537317 | 0.745356 | 0.735472 | 0.584576 | 0.745356 |
| 9 | 0.745356 | 0.611456 | 0.745356 | 0.745356 | 0.743481 | 0.630518 | 0.745356 | 0.584576 |
| 10 | 0.611456 | 0.745356 | 0.745356 | 0.630518 | 0.745356 | 0.745356 | 0.745356 | 0.537317 |
| 11 | 0.745356 | 0.745356 | 0.611456 | 0.611456 | 0.584576 | 0.630518 | 0.745356 | 0.743481 |
| 12 | 0.745356 | 0.630518 | 0.630518 | 0.745356 | 0.745356 | 0.611456 | 0.611456 | 0.537317 |
| 13 | 0.537317 | 0.743481 | 0.584576 | 0.735472 | 0.611456 | 0.537317 | 0.745356 | 0.745356 |
| 14 | 0.611456 | 0.630518 | 0.630518 | 0.745356 | 0.537317 | 0.745356 | 0.745356 | 0.745356 |
| 15 | 0.745356 | 0.745356 | 0.745356 | 0.630518 | 0.537317 | 0.611456 | 0.611456 | 0.745356 |

| Index | 8 | 9 | 10 | 11 | 12 | 13 | 14 | 15 |
|---|---|---|---|---|---|---|---|---|
| 0 | 0.743481 | 0.745356 | 0.611456 | 0.745356 | 0.745356 | 0.537317 | 0.611456 | 0.745356 |
| 1 | 0.537317 | 0.611456 | 0.745356 | 0.745356 | 0.630518 | 0.743481 | 0.630518 | 0.745356 |
| 2 | 0.745356 | 0.745356 | 0.745356 | 0.611456 | 0.630518 | 0.584576 | 0.630518 | 0.745356 |
| 3 | 0.537317 | 0.745356 | 0.630518 | 0.611456 | 0.745356 | 0.735472 | 0.745356 | 0.630518 |
| 4 | 0.745356 | 0.743481 | 0.745356 | 0.584576 | 0.745356 | 0.611456 | 0.537317 | 0.537317 |
| 5 | 0.735472 | 0.630518 | 0.745356 | 0.630518 | 0.611456 | 0.537317 | 0.745356 | 0.611456 |
| 6 | 0.584576 | 0.745356 | 0.745356 | 0.745356 | 0.611456 | 0.745356 | 0.745356 | 0.611456 |
| 7 | 0.745356 | 0.584576 | 0.537317 | 0.743481 | 0.537317 | 0.745356 | 0.745356 | 0.745356 |
| 8 | 1 | 0.630518 | 0.611456 | 0.630518 | 0.745356 | 0.745356 | 0.611456 | 0.745356 |
| 9 | 0.630518 | 1 | 0.537317 | 0.735472 | 0.537317 | 0.611456 | 0.745356 | 0.745356 |
| 10 | 0.611456 | 0.537317 | 1 | 0.745356 | 0.584576 | 0.630518 | 0.743481 | 0.735472 |
| 11 | 0.630518 | 0.735472 | 0.745356 | 1 | 0.745356 | 0.745356 | 0.537317 | 0.537317 |
| 12 | 0.745356 | 0.537317 | 0.584576 | 0.745356 | 1 | 0.745356 | 0.735472 | 0.743481 |
| 13 | 0.745356 | 0.611456 | 0.630518 | 0.745356 | 0.745356 | 1 | 0.745356 | 0.630518 |
| 14 | 0.611456 | 0.745356 | 0.743481 | 0.537317 | 0.735472 | 0.745356 | 1 | 0.584576 |
| 15 | 0.745356 | 0.745356 | 0.735472 | 0.537317 | 0.743481 | 0.630518 | 0.584576 | 1 |

TABLE 15

| u | φ(0) | φ(1) | φ(2) | φ(3) | φ(4) | φ(5) |
|---|---|---|---|---|---|---|
| 0 | 1 | 1 | 1 | 1 | 3 | −3 |
| 1 | 1 | 1 | −1 | −3 | −3 | 3 |
| 2 | 1 | 1 | 3 | 1 | −3 | 3 |
| 3 | 1 | −1 | −1 | −1 | 1 | −3 |
| 4 | 1 | −1 | 3 | −3 | −1 | −1 |
| 5 | 1 | 3 | 1 | −1 | −1 | 3 |
| 6 | 1 | −3 | −3 | 1 | 3 | 1 |
| 7 | −1 | −1 | 1 | −3 | −3 | −1 |
| 8 | −1 | −1 | −1 | 3 | −3 | −1 |
| 9 | 3 | −1 | 1 | −3 | −3 | 3 |
| 10 | 3 | −1 | 3 | −3 | −1 | 1 |
| 11 | 3 | 3 | −3 | −3 | −3 | −1 |
| 12 | 3 | −3 | 3 | −1 | 3 | 3 |
| 13 | −3 | 1 | 3 | 1 | −3 | −1 |
| 14 | −3 | 1 | −3 | 3 | −3 | −1 |
| 15 | −3 | 3 | −3 | 1 | 1 | −3 |

TABLE 16

| u | φ(0) | φ(1) | φ(2) | φ(3) | φ(4) | φ(5) |
|---|---|---|---|---|---|---|
| 0 | 1 | 1 | 1 | 1 | 3 | −3 |
| ~~1~~ | ~~1~~ | ~~1~~ | ~~1~~ | ~~−3~~ | ~~−3~~ | ~~−3~~ |
| 2 | 1 | 1 | 3 | 1 | −3 | 3 |
| 3 | 1 | −1 | −1 | −1 | 1 | −3 |
| 4 | 1 | −1 | 3 | −3 | −1 | −1 |
| 5 | 1 | 3 | 1 | −1 | −1 | 3 |
| 6 | 1 | −3 | −3 | 1 | 3 | 1 |
| 7 | −1 | −1 | 1 | −3 | −3 | −1 |
| 8 | −1 | −1 | −1 | 3 | −3 | −1 |
| 9 | 3 | −1 | 1 | −3 | −3 | 3 |
| 10 | 3 | −1 | 3 | −3 | −1 | 1 |
| ~~11~~ | ~~−3~~ | ~~−3~~ | ~~−3~~ | ~~−3~~ | ~~−3~~ | ~~1~~ |

TABLE 16-continued

| u | φ(0) | φ(1) | φ(2) | φ(3) | φ(4) | φ(5) |
|---|---|---|---|---|---|---|
| 12 | 3 | −3 | 3 | −1 | 3 | 3 |
| 13 | −3 | 1 | 3 | 1 | −3 | −1 |
| 14 | −3 | 1 | −3 | 3 | −3 | −1 |
| 15 | −3 | 3 | −3 | 1 | 1 | −3 |

The number of base sequences in each tone transmission is determined so that a maximum cross correlation value is minimized.

However, the number of base sequences may not be enough for NB-IoT.

Therefore, an additional method for randomizing interference from DMRS of other cell needs to be applied.

Namely, an additional number of DMRS sequences may be provided by exploiting a cyclic shift (CS).

Alternatively, an orthogonal cover code (OCC) and/or a sequence group hopping may be used for inter-cell interference randomization.

Hereinafter, another method for constructing a DMRS sequence table is described.

When constructing DMRS sequence tables for 3-tone transmission and 6-tone transmission, a method for separating and individually optimizing the two tables may be considered, but the two DMRS sequence tables may be designed to be linked to each other.

For example, if a DMRS sequence for 3-tone transmission is specified, a DMRS sequence for the 6-tone transmission may be generated by adding three QPSK symbols before or after the DMRS sequence of the 3-tone transmission.

It is assumed that 3-tone transmission uses N1 DMRS sequences and 6-tone transmission uses N2 DMRS sequences.

If N1=N2, all the DMRS sequences for the 3-tone transmission are used once to configure the DMRS sequences of 6-tone transmission.

If N1<N2, the DMRS sequences of the 3-tone transmission may be repeatedly used one or more times, and the number of repetitions of DMRS sequences may be set as equal as possible.

Alternatively, the DMRS sequences as many as N2−N1 in the 6-tone transmission may be generated independently without being based on the DMRS sequences of the 3-tone transmission.

FIG. 29 illustrates an example of a method for generating a DMRS sequence for multi-tone transmission proposed by this specification.

More specifically, FIG. 29 schematically illustrates an example of a method for generating a DMRS sequence for 6-tone transmission based on a DMRS sequence for 3-tone transmission.

In other words, FIG. 29 illustrates that the DMRS sequence for 6-tone transmission is configured by adding (three additional QPSK symbols) before or after the DMRS sequence for 3-tone transmission.

DMRS sequences used for the multi-tone transmission of the NB-IoT may be determined so that the UE selects one from a DMRS sequence table determined through System Information Broadcast (SIB).

When the DMRS sequence of 6-tone transmission is generated (or created) based on the DMRS sequence of 3-tone transmission, two transmission schemes may share a DMRS sequence table.

In this case, the base station may transmit DMRS sequence selection information capable of selecting a DMRS sequence to both a 3-tone transmission UE and a 6-tone transmission UE through one SIB information.

For example, if an n-th sequence is used as the DMRS sequence of 3-tone transmission, the DMRS sequence of 6-tone transmission generated based on the n-th sequence may be defined to be simultaneously used in the corresponding cell.

Because the SIB information for the two transmissions (including the 3-tone transmission and the 6-tone transmission) is distinguished through the above operation, there is an advantage that data included in the SIB can be reduced.

A method for selecting the DMRS sequence by the UE performing the 3-tone transmission may select and use three QPSK symbols from the front or the back in a DMRS sequence table of the 6-tone transmission.

For example, it is assumed that 16 DMRS sequences are used for each of the 3-tone transmission and the 6-tone transmission.

At this time, preceding three QPSK symbols in sequences corresponding to indexes 0 to 7 of the DMRS sequence table may be used for the 3-tone transmission, and last three QPSK symbols in sequences corresponding to indexes 8 to 15 of the DMRS sequence table may be used for the DMRS sequence of the 3-tone transmission.

The preceding three QPSK symbols may mean sequences corresponding to three indexes from the front of the indexes 0 to 7.

Alternatively, the preceding or last three QPSK symbols in all the indexes (i.e., the indexes 0 to 15) of the DMRS sequence table may be used for the DMRS sequence of the 3-tone transmission.

In this case, the DMRS sequence in the 3-tone transmission may be determined using index information of the table.

The determination of the DMRS sequence may be performed by combining SIB information and tone allocation information for determining the index of the sequence.

Although a corresponding method may be used to simultaneously indicate the DMRS sequence of the 3-tone transmission and the DMRS sequence of the 6-tone transmission through single SIB information, the corresponding method may also be used to perform DMRS sequence selection based on a cell-ID.

Although the above-mentioned contents have been described limiting to the multi-tone transmission of NB-IoT supporting together the 3-tone transmission and the 6-tone transmission for convenience of explanation, they may be applied to a case where a DMRS sequence table is constructed simultaneously considering all of systems, to which different tone allocations are allowed, and two or more multi-tone transmissions.

FIG. 30 illustrates resource region mapping of a DMRS sequence for multi-tone transmission proposed by this specification.

In other words, FIG. 30 illustrates examples of a DMRS sequence table capable of being constructed by combinations of a DMRS sequence of 3-tone transmission and a DMRS sequence of 6-tone transmission.

Even if a DMRS sequence of 3-tone transmission and a DMRS sequence of 6-tone transmission are not connected and are individually designed, a table index has to be determined in consideration of correlation property between the sequences.

Here, a method for determining a DMRS sequence for 3-tone transmission and a DMRS sequence for 6-tone transmission using one SIB may also be used.

In terms of inter-cell interference, the DMRS sequence used in a cell may be determined to be optimized through cell planning.

In this case, cross correlation property between sequences in the determined DMRS sequence table may be considered for the cell planning for the minimization of an inter-cell interference impact.

When the base station transmits information related to DMRS to a UE through SIB and DMRS sequences of 3-tone transmission and 6-tone transmission are simultaneously determined through single SIB, two sequences need to be simultaneously determined through one index, and impacts of interference on and from a contiguous cell needs to be simultaneously considered.

In this case, indexes of 3-tone and 6-tone DMRS sequence tables may be determined by the following rules.

(a) Index order of each of the 3-tone and 6-tone DMRS sequence tables is adjusted so that correlation property between the DMRS sequences of the 3-tone transmission and correlation property between the DMRS sequences of the 6-tone transmission have a similar correlation for each index.

(b) Sequences with high cross correlation among the 3-tone and 6-tone DMRS sequences form a pair and are assigned the same index.

For example, in the case of (a), if correlation between a sequence of an n-th index and a sequence of an m-th index in the DMRS sequences of the 3-tone transmission is relatively higher than correlation of other sequence pairs, the sequence indexes may be determined so that correlation between a sequence of an n-th index and a sequence of an m-th index in the DMRS sequences of the 6-tone transmission has a high value.

This relationship is applied to all the sequence pairs that may occur in each of the DMRS sequences of the 3-tone transmission and the 6-tone transmission and may be configured such that the tendency may be maintained even if there is no exact match.

As another example, in the case of (b), it may be difficult to configure a sequence simultaneously considering the cross correlation between the 3-tone transmission and the 6-tone transmission.

In addition, it may be difficult to optimize the correlation between different tone transmissions due to optimization problem in each case.

In order to minimize the cross correlation problem between different tone transmissions, a sequence pair having a worst case correlation value between the 3-tone DMRS sequence and the 6-tone DMRS sequence can be assigned one index.

In the NB-IoT, since no interference occurs between the DMRSs within the same cell, a probability of occurrence of the worst case correlation that may occur between the 3-tone DMRS and the 6-tone DMRS can be reduced using the above-described DMRS sequence index configuration method.

Although the above-mentioned contents and methods have been described limiting to the multi-tone transmission of NB-IoT supporting together the 3-tone transmission and the 6-tone transmission for convenience of explanation, they may be applied to a case where a DMRS table is configured simultaneously considering all of systems, to which different tone allocations are allowed, and two or more multi-tone transmissions.

FIG. 31 illustrates an example of a method for transmitting and receiving DMRS of NB-IoT proposed by this specification.

Here, the DMRS of NB-IoT may be represented as Narrowband DMRS.

First, a UE generates a reference signal sequence used for demodulation in S3110.

Namely, the reference signal sequence may mean a sequence for DMRS.

Afterwards, the UE maps the generated reference signal sequence to at least one symbol in S3120.

Afterwards, the UE transmits the demodulation reference signal (DMRS) to a base station through a single subcarrier in the at least one symbol in S3130.

The reference signal sequence is generated when the number of subcarriers within a resource unit defined in the NB-IoT is 1.

Here, the case in which the number of subcarriers within the resource unit defined in the NB-IoT is 1 may be interpreted to have the same meaning as single tone transmission or single subcarrier transmission.

Further, the resource unit may be defined as consecutive SC-FDMA (Single Carrier-Frequency Division Multiplexing Access) symbols in a time domain and consecutive subcarriers in a frequency domain.

The reference signal sequence is generated using a specific sequence generated based on an m-sequence.

Herein, the specific sequence may be a gold sequence.

A cint value of a second m-sequence used in the generation of the specific sequence is 35.

As mentioned above, when the cint value is 35, a cross correlation value of the specific sequence is lowest.

In other words, it may be interpreted that the reference signal sequence, i.e., the reference signal sequence for the DMRS is generated using the second m-sequence having cint=35.

Here, the cint is a value indicating initialization of c(n), and the c(n) indicates the specific sequence, i.e., the gold sequence.

Because the initialization of the second m-sequence is determined by the cint value and the reference signal sequence is generated based on the second m-sequence, it may be interpreted that the reference signal sequence is initialized to cint=35.

A length of the reference signal sequence may be determined based on the number of slots included in the resource unit.

The number of slots included in the resource unit may be 16, and the number of SC-FDMA symbols included in the slot may be 7.

The at least one SC-FDMA symbol may be a fourth SC-FDMA symbol.

A subcarrier spacing of the single subcarrier may be 3.75 kHz or 15 kHz, and π/2-BPSK modulation or π/4-QPSK modulation may be applied to the transmission of the single subcarrier.

The specific sequence may be the gold sequence and may be initialized each time a new transmission starts.

FIG. 32 illustrates another example of a method for transmitting and receiving DMRS of NB-IoT proposed by this specification.

In other words, FIG. 31 illustrates the single tone transmission of DMRS, and FIG. 32 illustrates multi-tone transmission of DMRS.

First, a UE generates a reference signal sequence used for demodulation in S3210.

Afterwards, the UE maps the reference signal sequence to at least one symbol in S3220.

Afterwards, the UE transmits the demodulation reference signal (DMRS) to a base station through multi-subcarriers in the at least one symbol in S3230.

Here, the reference signal sequence is generated when the number of subcarriers within a resource unit defined in the NB-IoT is greater than 1.

Further, the resource unit may be defined as consecutive SC-FDMA (Single Carrier-Frequency Division Multiplexing Access) symbols in a time domain and consecutive subcarriers in a frequency domain.

The number of subcarriers within the resource unit defined in the NB-IoT may be 3 or 6.

When the number of subcarriers within the resource unit defined in the NB-IoT is 3, the number of multi-subcarriers is 3.

When the number of multi-subcarriers is 3 and an index of a base sequence used in the generation of the reference signal sequence is 7, φ(0), φ(1) and φ(2) used for the base sequence are 1, 1, and −1, respectively.

Further, when the number of subcarriers within the resource unit defined in the NB-IoT is 6, the number of multi-subcarriers is 6.

When the number of multi-subcarriers is 6, the number of indexes of the base sequence used in the generation of the reference signal sequence may be 14.

In this case, φ(0), φ(1), φ(2), φ(3), φ(4) and φ(5) in a first index of the base sequence are 1, 1, 1, 1, 3, and −3, respectively.

And, φ(0), φ(1), φ(2), φ(3), φ(4) and φ(5) in a second index of the base sequence are 1, 1, 3, 1, −3, and 3, respectively.

And, φ(0), φ(1), φ(2), φ(3), φ(4) and φ(5) in a third index of the base sequence are 1, −1, −1, −1, 1, and −3, respectively.

And, φ(0), φ(1), φ(2), φ(3), φ(4) and φ(5) in a fourth index of the base sequence are 1, −1, 3, −3, −1, and −1, respectively.

And, φ(0), φ(1), φ(2), φ(3), φ(4) and φ(5) in a fifth index of the base sequence are 1, 3, 1, −1, −1, and 3, respectively.

And, φ(0), φ(1), φ(2), φ(3), φ(4) and φ(5) in a sixth index of the base sequence are 1, −3, −3, 1, 3, and 1, respectively.

And, φ(0), φ(1), φ(2), φ(3), φ(4) and φ(5) in a seventh index of the base sequence are −1, −1, 1, −3, −3, and −1, respectively.

And, φ(0), φ(1), φ(2), φ(3), φ(4) and φ(5) in an eighth index of the base sequence are −1, −1, −1, 3, −3, and −1, respectively.

And, φ(0), φ(1), φ(2), φ(3), φ(4) and φ(5) in a ninth index of the base sequence are 3, −1, 1, −3, −3, and 3, respectively.

And, φ(0), φ(1), φ(2), φ(3), φ(4) and φ(5) in a tenth index of the base sequence are 3, −1, 3, −3, −1, and 1, respectively.

And, φ(0), φ(1), φ(2), φ(3), φ(4) and φ(5) in an eleventh index of the base sequence are 3, −3, 3, −1, 3, and 3, respectively.

And, φ(0), φ(1), φ(2), φ(3), φ(4) and φ(5) in a twelfth index of the base sequence are −3, 1, 3, 1, −3, and −1, respectively.

And, φ(0), φ(1), φ(2), φ(3), φ(4) and φ(5) in a thirteenth index of the base sequence are −3, 1, −3, 3, −3, and −1, respectively.

And, φ(0), φ(1), φ(2), φ(3), φ(4) and φ(5) in a fourteenth index of the base sequence are −3, 3, −3, 1, 1, and −3, respectively.

Hereinafter, an UE implementing a method proposed by this specification is briefly described.

Namely, the UE may include a Radio Frequency (RF) unit for transmitting and receiving a radio signal and a processor for controlling the RF unit.

The processor may control to generate a reference signal sequence used for demodulation, map the reference signal sequence to at least one symbol, and transmit the demodulation reference signal (DMRS) to the base station through a single subcarrier in the at least one symbol.

In this case, the reference signal sequence is generated when the number of subcarriers within a resource unit defined in the NB-IoT is 1.

The resource unit may be defined as consecutive SC-FDMA (Single Carrier-Frequency Division Multiplexing Access) symbols in a time domain and consecutive subcarriers in a frequency domain.

The reference signal sequence is generated using a specific sequence generated based on an m-sequence.

Further, a cint value of a second m-sequence used in the generation of the specific sequence is 35.

General Device to which the Present Invention is Applicable

FIG. 33 is a block diagram of a configuration of a wireless communication device according to an embodiment of the present invention.

Referring to FIG. 33, a wireless communication system includes a base station 3310 and a plurality of UEs 3320 located within an area of the base station 3310.

The base station 3310 includes a processor 3311, a memory 3312, and a radio frequency (RF) unit 3313. The processor 3311 implements functions, processes, and/or methods proposed with reference to FIGS. 1 to 32. Layers of a radio interface protocol may be implemented by the processor 3311. The memory 3312 is connected to the processor 3311 and stores various information for driving the processor 3311. The RF unit 3313 is connected to the processor 3311 and transmits and/or receives radio signals.

The UE 3320 includes a processor 3321, a memory 3322, and an RF unit 3323. The processor 3321 implements functions, processes, and/or methods proposed with reference to FIGS. 1 to 32. Layers of a radio interface protocol may be implemented by the processor 3321. The memory 3322 is connected to the processor 3321 and stores various information for driving the processor 3321. The RF unit 3323 is connected to the processor 3321 and then transmits and/or receives radio signals.

The memory 3312/3322 may be provided inside or outside the processor 3311/3321 and may be connected to the processor 3311/3321 by various well-known means.

Moreover, the base station 3310 and/or the UE 3320 may have a single antenna or multiple antennas.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

While the present invention has been described and illustrated herein with reference to the preferred embodiments thereof, it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

INDUSTRIAL APPLICABILITY

Although the present invention is described with reference to examples applying to a 3GPP NB-IoT system, it may be applied to various wireless communication systems other than the 3GPP NB-IoT system.

The invention claimed is:

1. A method of transmitting, by a user equipment (UE), a demodulation reference signal (DMRS) in a wireless communication system supporting NB (Narrow-Band)-IoT (Internet of Things), the method comprising:

generating a reference signal sequence used for demodulation based on a number of sucarriers within a resource unit being 3;

mapping the reference signal sequence to at least one symbol; and transmitting, to a base station, the demodulation reference signal (DMRS) in the at least one symbol, wherein a base sequence used in a generation of the reference signal sequence is based on φ(0), φ(1), and φ(2), wherein:

φ(0), φ(1), and φ(2) are 1, 1, and −3, respectively,
φ(0), φ(1), and φ(2) are 1, −3, and −3, respectively,
φ(0), φ(1), and φ(2) are 1, 3, and 1, respectively,
φ(0), φ(1), and φ(2) are 1, −1, and 1, respectively,
φ(0), φ(1), and φ(2) are 1, 1, and 3, respectively,
φ(0), φ(1), and φ(2) are 1, 3, and 3, respectively,
φ(0), φ(1), and φ(2) are 1, −1, and −1, respectively, or
φ(0), φ(1), and φ(2) are 1, 1, and −1, respectively.

2. The method of claim 1, wherein, based on an index of a base sequence used in the generation of the reference signal sequence being 7, φ(0), φ(1), and φ(2) used for the base sequence are 1, 1, and −1, respectively.

3. The method of claim 1, wherein a number of slots included in the resource unit is 8, wherein a number of SC-FDMA (Single Carrier-Frequency Division Multiplexing Access) symbols included in the slot is 7.

4. The method of claim 1, wherein a subcarrier spacing of a subcarrier is 3.75 kHz or 15 kHz.

5. The method of claim 1, wherein QPSK modulation is applied to a transmission of a subcarrier.

6. The method of claim 1, wherein the resource unit is defined as consecutive SC-FDMA (Single Carrier-Frequency Division Multiplexing Access) symbols in a time domain and consecutive subcarriers in a frequency domain.

7. A User Equipment (UE) configured to transmit a demodulation reference signal (DMRS) in a wireless communication system supporting NB (Narrow-Band)-IoT (Internet of Things), the UE comprising:

at least one transceiver for transmitting and receiving a radio signal; and at least one processor for controlling the at least one transceiver, wherein the at least one processor controls to:

generate a reference signal sequence used for demodulation based on a number of sucarriers within a resource unit being 3;

map the reference signal sequence to at least one symbol; and transmit, to a base station, the demodulation reference signal (DMRS) in the at least one symbol, wherein a base sequence used in a generation of the reference signal sequence is based on φ(0), φ(1), and φ(2), wherein:

φ(0), φ(1), and φ(2) are 1, 1, and −3, respectively,
φ(0), φ(1), and φ(2) are 1, −3, and −3, respectively,
φ(0), φ(1), and φ(2) are 1, 3, and 1, respectively,
φ(0), φ(1), and φ(2) are 1, −1, and 1, respectively,
φ(0), φ(1), and φ(2) are 1, 1, and 3, respectively,
φ(0), φ(1), and φ(2) are 1, 3, and 3, respectively,
φ(0), φ(1), and φ(2) are 1, −1, and −1, respectively, or
φ(0), φ(1), and φ(2) are 1, 1, and −1, respectively.

8. The UE of claim 7, wherein based on an index of a base sequence used in the generation of the reference signal sequence being 7, φ(0), φ(1), and φ(2) used for the base sequence are 1, 1, and −1, respectively.

9. The UE of claim 7, wherein a number of slots included in the resource unit is 8, wherein a number of SC-FDMA (Single Carrier-Frequency Division Multiplexing Access) symbols included in the slot is 7.

10. The UE of claim 7, wherein a subcarrier spacing of a subcarrier is 3.75 kHz or 15 kHz.

11. The UE of claim 7, wherein QPSK modulation is applied to a transmission of a subcarrier.

12. The UE of claim 7, wherein the resource unit is defined as consecutive SC-FDMA (Single Carrier-Frequency Division Multiplexing Access) symbols in a time domain and consecutive subcarriers in a frequency domain.

* * * * *